United States Patent
Li et al.

(10) Patent No.: US 12,328,497 B2
(45) Date of Patent: Jun. 10, 2025

(54) SYSTEMS AND METHODS FOR CAPTURING AN IMAGE OF A DESIRED MOMENT

(71) Applicant: Adeia Imaging LLC, San Jose, CA (US)

(72) Inventors: Zhiyun Li, Kenmore, WA (US); Ruoyun Li, Kenmore, WA (US); Qingyun Li, Kenmore, WA (US)

(73) Assignee: Adeia Imaging LLC, San Jose, CA (US)

(*) Notice: Subject to any disclaimer, the term of this patent is extended or adjusted under 35 U.S.C. 154(b) by 198 days.

(21) Appl. No.: 18/101,251

(22) Filed: Jan. 25, 2023

(65) Prior Publication Data

US 2024/0259668 A1    Aug. 1, 2024

(51) Int. Cl.
*H04N 23/62* (2023.01)
*H04N 23/60* (2023.01)
*H04N 23/80* (2023.01)

(52) U.S. Cl.
CPC ............. *H04N 23/62* (2023.01); *H04N 23/64* (2023.01); *H04N 23/80* (2023.01)

(58) Field of Classification Search
CPC ........ H04N 23/62; H04N 23/64; H04N 23/80; H04N 23/611; H04N 23/617; G06V 10/82
See application file for complete search history.

(56) References Cited

U.S. PATENT DOCUMENTS

| | | | |
|---|---|---|---|
| 8,228,413 B2 | 7/2012 | Ellenby et al. | |
| 9,210,319 B2 | 12/2015 | Rav-Acha et al. | |
| 10,334,158 B2 | 6/2019 | Gove | |
| 10,674,083 B2 | 6/2020 | Emmett et al. | |
| 11,076,091 B1 | 7/2021 | Westheimer et al. | |
| 11,133,005 B2 | 9/2021 | Aher et al. | |
| 2013/0104080 A1 | 4/2013 | Bosworth et al. | |
| 2017/0213108 A1* | 7/2017 | Bergsma | G06F 18/22 |
| 2018/0146133 A1* | 5/2018 | Carceroni | H04N 23/63 |
| 2018/0373929 A1* | 12/2018 | Ye | G06V 10/50 |

(Continued)

FOREIGN PATENT DOCUMENTS

WO    2018097889 A1    5/2018

OTHER PUBLICATIONS

CLIP: Connecting text and images, Jan. 5, 2021 (https://openai.com/research/clip) (20 pages).

(Continued)

*Primary Examiner* — Gevell V Selby
(74) *Attorney, Agent, or Firm* — HALEY GUILIANO LLP

(57) ABSTRACT

Systems, methods and apparatuses are described for determining an image that corresponds to a received input instruction. Input may be received which comprises an instruction for an image sensor to capture at least one image of a subject and the instruction comprising at least one criterion for the at least one image of the subject. An image sensor may capture, based on the instruction, captured images of the subject. An instruction vector may be determined based on the instruction, and a captured image vector for each of the captured images of the subject may be determined. At least one captured image vector of the captured images and the instruction vector may be compared to determine a corresponding image from the captured images, and the corresponding image may be provided.

20 Claims, 11 Drawing Sheets

(56) References Cited

U.S. PATENT DOCUMENTS

2019/0095465 A1* 3/2019 Zhai .................. G06V 10/761
2020/0014848 A1   1/2020 Gove
2021/0089571 A1   3/2021 Perone et al.
2022/0366170 A1  11/2022 Wang et al.

OTHER PUBLICATIONS

DALL-E 2, (17 pages) (https://openai.com/product/dall-e-2).
DALLE: Creating images from text, Jan. 5, 2021 (25 pages) (https://openai.com/research/dall-e).
Goldman, "HTC Re camera review: A camera so simple it doesn't even have a power button," CNET (Nov. 6, 2014 (12 pages).
Krizhevsky, "The CIFAR-10 and CIFAR-100 datasets," (https://www.cs.toronto.edu/~kriz/cifar.html) (2009) (4 pages).
Lytro—Wikipedia (https://en.wikipedia.org/wiki/Lytro) (5 pages).
Sisodia, "Distillation of CLIP model and other experiments", Published PicCollage Company Blog, Aug. 10, 2021 (11 pages).
Sun397, TensorFlow Datasets (18 pages).
Deep AI Text To Image—AI Image Generator API (https://deepai.org/machine-learning-model/text2img) (13 pages).
About ImageNet, 2021, https://www.image-net.org/about.php (2 pages).
Radford et al., "Learning Transferable Visual Models From Natural Language Supervision," PMLR 139:8748-8763, 2021.
Ramesh et al., "Zero-Shot Text-to-Image Generation," Proceedings of the 38th International Conference on Machine Learning, PMLR 139:8821-8831, 2021.
PCT International Search Report for International Application No. PCT/US2024/012749, mailed May 23, 2024 (14 pages).

\* cited by examiner

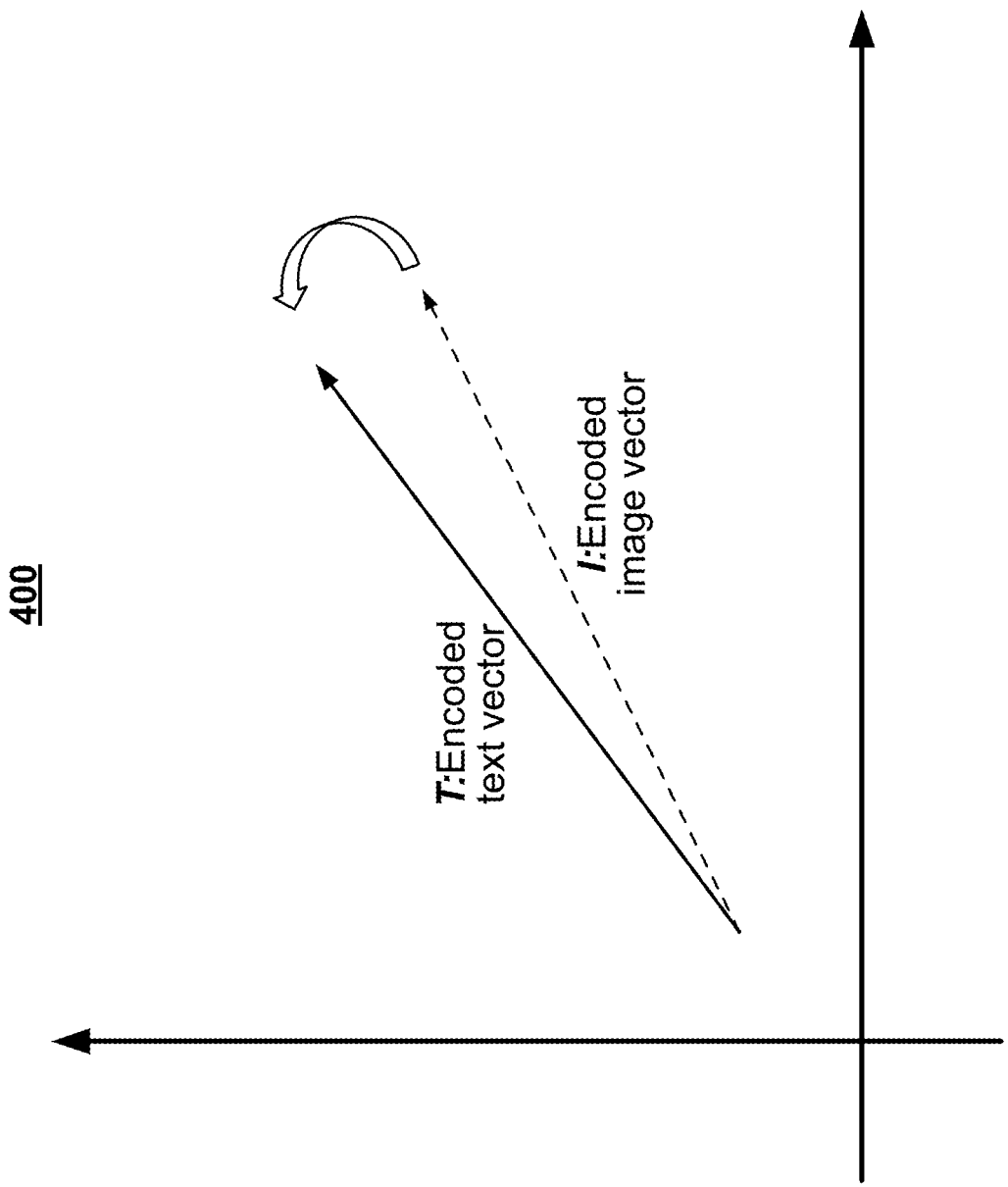

SYSTEMS AND METHODS FOR CAPTURING AN IMAGE OF A DESIRED MOMENT

BACKGROUND

This disclosure is directed to systems and methods for determining an image that corresponds to a received input instruction. In particular, at least one captured image from a plurality of captured images may be compared to the input instruction to determine a corresponding image.

SUMMARY

Using a camera to capture important or picturesque moments generally requires the photographer's undivided attention and patience, as well as quick reflexes to select a button or interface of the camera to actuate the capture function of the camera. For example, it may be challenging to capture, at the optimal moment, a whale jumping out of the water, a dog jumping to catch a frisbee, a baby making a funny face, an eagle capturing a fish from a body of water, or a group of people jumping in unison. Moreover, even if the photographer recognizes that a desired moment is occurring, there may be a delay between such recognition on the part of the photographer and the photographer actuating the capture function of the camera.

In one approach, a camera may offer a burst mode, which when selected by the user captures a sequence of pictures during a short time, in the hope that at least one of the pictures may capture the desired moment. However, such a burst mode has certain limitations. For example, the burst mode for many cameras has certain settings (e.g., exposure duration and framerate limitations) to avoid generating too many high-resolution image files and quickly filling up storage (e.g., on the device and/or in the cloud), and/or it may be a hassle for the user to navigate through and manage images captured via the burst mode. As another example, while burst mode may be useful when the subject is in continuous and predictable motion within a reasonable timeframe, such as in sports photography, if the desired moment is less predictable and/or may occur randomly (e.g., a whale jumping out of the water or a baby making a funny face), the burst mode may not be beneficial unless the photographer is concentrating intently on the subject and quickly reacts in time to trigger the burst mode. Moreover, requiring the photographer's full attention, quick judgment, and quick action may cause the photographer to be preoccupied with his or her camera instead of enjoying important or interesting moments of his or her life. Accordingly, many users, particularly non-professional photographers, eventually become lazy and simply use the burst mode in a "spray and pray" manner, which often results in the capture of large amounts of low-quality images.

To help overcome these problems, systems, apparatuses, and methods are provided herein for receiving input comprising an instruction for an image sensor to capture at least one image of a subject and the instruction comprising at least one criterion for the at least one image of the subject and capturing, by the image sensor and based on the instruction, a plurality of captured images of the subject. The provided systems, methods, and apparatuses may be further configured to determine an instruction vector based on the instruction and determine a captured image vector for each of the plurality of captured images of the subject. The provided systems, methods, and apparatuses may be further configured to compare at least one captured image vector of the plurality of captured images and the instruction vector, to determine a corresponding image from the plurality of captured images, and provide the corresponding image.

In some embodiments, systems, apparatuses and methods are provided herein for receiving input comprising an instruction for an image sensor to capture at least one image of a subject and the instruction comprising at least one criterion for the at least one image of the subject, and generating a first vector based on the instruction. The provided systems, methods, and apparatuses may be further configured to cause the image sensor to observe a scene, analyze the observed scene, and generate, based on the analyzed scene, one or more second vectors. Based on a correspondence between the first vector and at least one of the one or more second vectors, the image sensor may be caused to capture one or more images of the scene. The provided systems, methods, and apparatuses may analyze the one or more captured images to determine an image corresponding to the first vector, and provide the determined image corresponding to the first vector.

Such aspects may enable a computing device to receive input (e.g., voice input comprising natural language elements, or any other suitable input) instructing an image sensor of the computing device describing a desired moment to be captured, process the input, and thereafter cause the image sensor to observe and automatically capture the desired moment. Accordingly, a user may be permitted to focus on being in the moment and enjoying the moment, while still being able to capture one or more desired images of the moment, and without requiring the user to apply his or her full attention, judgments, and actions towards the capturing of such one or more images.

In some embodiments, comparing the at least one captured image vector of the plurality of captured images and the instruction vector to determine the corresponding image from the plurality of captured images further comprises determining a plurality of angles, each angle of the plurality of angles comprising an angle created by a respective captured image vector and the instruction vector, and determining the corresponding image from the plurality of captured images based on the corresponding angle of the plurality of angles that is smallest or that is less than a threshold value.

In some embodiments, the capturing, by the image sensor, of the plurality of captured images of the subject is performed at a particular frames per second (FPS), and the particular FPS may be increased in real time based on the plurality of angles. In some embodiments, a high FPS may be enabled based at least in part on the plurality of captured images, which may be stored for analysis in a buffer associated with the image sensor and/or a computing device comprising the image sensor, without requiring all of such captured images to be persistently stored, e.g., written to disk of the image sensor and/or computing device.

In some embodiments, the capturing, by the image sensor, of the plurality of captured images of the subject is performed at a particular resolution, and the particular resolution is adjusted in real time based on the plurality of angles.

In some embodiments, determining the instruction vector comprises determining text that corresponds to the at least one criterion, and providing the text to a trained machine learning model which outputs the instruction vector based at least in part on the text.

In some embodiments, determining the captured image vector for each of the plurality of captured images of the subject comprises, for each respective captured image of the plurality of captured images, providing the respective captured image to a trained machine learning model, which outputs a respective captured image vector for the provided respective captured image.

In some embodiments, the provided methods, apparatuses, and systems may further comprise training a machine learning model to receive as input text corresponding to at least one criterion for at least one image of a subject and provide as output an instruction vector, and training the machine learning model to receive as input a captured image and provide as output a captured image vector.

In some embodiments, the received input is voice input, textual input, tactile input, or any combination thereof.

In some embodiments, the at least one criterion is a first criterion, the instruction further comprises a second criterion, the instruction vector is a first instruction vector that corresponds to the first criterion, the corresponding image is a first corresponding image. The provided methods, apparatuses, and systems may further comprise determining a second instruction vector based on the second criterion of the instruction, comparing at least one captured image vector of the plurality of captured images and the second instruction vector to determine a second corresponding image from the plurality of captured images, and providing the second corresponding image.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that, for clarity and ease of illustration, these drawings are not necessarily made to scale.

FIG. 4 depicts an illustrative technique for comparing a captured image vector and an instruction vector to determine an image that corresponds to a received input instruction, in accordance with some embodiments of this disclosure.

DETAILED DESCRIPTION

Figure 1:
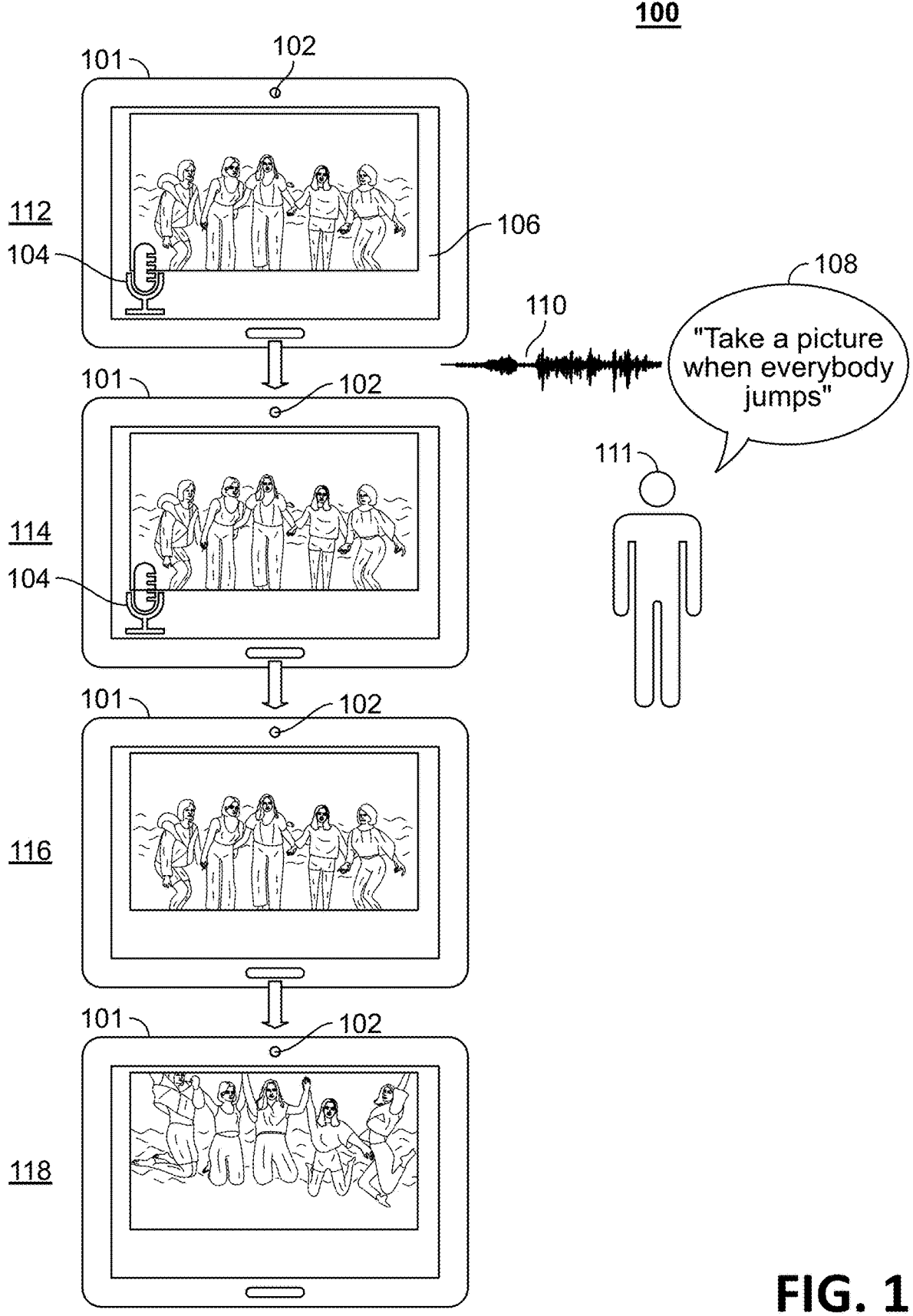
FIG. 1 depicts an illustrative flowchart for determining an image that corresponds to a received input instruction, in accordance with some embodiments of this disclosure.

FIG. 1 depicts an illustrative flowchart 100 for determining an image that corresponds to a received input instruction, in accordance with some embodiments of this disclosure. Computing device 101 may comprise image sensor 102, microphone 104 and display 106. Computing device 101 may be, for example, any suitable type of camera; a mobile device such as, for example, a smart phone; a tablet; a laptop computer; a personal computer; a desktop computer; a smart television; a smart watch or wearable device; smart glasses; a stereoscopic display; a wearable camera; virtual reality (VR) glasses; VR goggles; a stereoscopic display; augmented reality (AR) glasses; an AR head-mounted display (HMD); a VR HMD or any other suitable computing device, or any combination thereof.

The steps shown and described in flowchart 100 of FIG. 1 may be performed at least in part by an image capture application. The image capture application may be executing at least in part at computing device 101 and/or at one or more remote servers and/or at other computing devices. The image capture application may be configured to perform the functionalities described herein. In some embodiments, the image capture application may be understood as middleware or application software or any combination thereof. In some embodiments, the image capture application may be considered as part of an operating system (OS) of computing device 101 or separate from the OS. The OS may be operable to initialize and control various software and/or hardware components of computing device 101. The image capture application may correspond to or be included as part of an image capture system, which may be configured to perform the functionalities described herein.

In some embodiments, the image capture system may comprise one or more cameras, one or more image sensors and/or any other suitable types of sensors, the image capture application, an image capture platform, one or more image and/or text and/or audio analysis applications, one or more AR or VR applications, one or more video communication applications and/or image communication applications and/or other communication applications, one or more streaming media applications, one or more social networking applications, any suitable number of displays, sensors or devices such as those described in FIGS. 1-9, or any other suitable software and/or hardware components, or any combination thereof.

In some embodiments, the image capture application may be installed at or otherwise provided to a particular computing device (e.g., computing device 101 of FIG. 1), may be provided via an application programming interface (API), or may be provided as an add-on application to another platform or application. In some embodiments, software tools (e.g., one or more software development kits, or SDKs) may be provided to any suitable party, to enable the party to implement the functionalities as discussed herein.

As shown at 112, computing device 101 may generate for display, at display 106, visual content captured by image sensor 102, where the visual content may correspond to an environment external to or surrounding image sensor 102 of computing device 101. In the example of FIG. 1, the environment may correspond to a beach at which five users are present. While image sensor 102 is described in the example of FIG. 1, any suitable other sensor(s) may be used in addition or alternatively to image sensor 102. In some embodiments, the visual content shown at 112 may correspond to a preview of an image capable of being captured by computing device 101, such as if suitable input is received from user 111 instructing an image to be captured. In some embodiments, the visual content shown at 112 may be continuously updated in real time as objects, persons, users and/or entities in the environment change locations or change their appearance or otherwise change. For example, computing device 101 may update the display of the environment captured by image sensor 102 as the objects or users move about the environment and/or as the field of view of computing device 101 changes. In some embodiments, computing device 101 may not include display 106, and thus a user may not be shown the visual content shown at 112.

In some embodiments, the image capture application may activate image sensor 102, and/or provide the interface shown at 112 or 114, based on receiving input from user 111, e.g., selection of a particular button or option and/or a request to access a camera of computing device 101; based on voice input received at microphone 104; based on detecting that computing device 101 and/or image sensor 102 is oriented in a desired direction; based on detecting that image sensor 102 is capturing visual content; and/or based on any other suitable input. In some embodiments, user 111 may be holding computing device 101, or wearing computing device 101, or user 111 may have mounted computing device 101 on a tripod or other object. In some embodiments, image sensor 102 may be configured to automatically track one or more entities or objects in the environment captured by image sensor 102.

At 114, the image capture system may receive input 108 comprising an instruction for image sensor 102 to capture at least one image of a subject, and the instruction may comprise at least one criterion for the at least one image of the subject. In the example of FIG. 1, input 108 corresponds to "Take a picture when everybody jumps," and the subject may correspond to each of the users included in the image being captured by image sensor 102. In some embodiments, the image capture system may be configured to identify particular users or entities in the input instruction. For example, if the input instruction is "Take a picture when Katie and Melissa jump," the image capture system may analyze a stored image of the user "Katie" and a stored image of the user "Melissa," and determine which user shown at interface 114 corresponds to Katie and which user corresponds to Melissa.

In some embodiments, input 108 may be received via microphone 104 of computing device 101. Microphone 104 may be configured to capture audio input 108 in a vicinity of computing device 101, e.g., uttered by the user holding, wearing and/or operating computing device 101; one of the five users in the view of the camera of computing device 101; or any other suitable user. In some embodiments, the image capture system may receive input 108 at any time, e.g., regardless of whether image sensor 102 is activated to capture images and/or observe its environment, and/or regardless of whether the interface shown at 112 is being provided to user 111 at the time of receiving input 108. In some embodiments, input 108 may be received when image sensor 102 is activated to capture images and/or observe its environment. In some embodiments, input 108 may be received in combination with a wake word, such as, for example, "Hi, Camera," to activate and/or instruct image sensor 102 to begin capturing images, and/or based on receiving communications from a secondary device (e.g., a smartwatch) in communication with computing device 101 and/or image sensor 102, or any combination thereof.

In some embodiments, the image capture system may convert audio input 108 to a corresponding textual description. For example, the image capture system may monitor for and analyze audio signals uttered by one or more users (or other audio signals) by digitizing audio signal 110 (corresponding to audio input 108) received in analog form by one or more microphones of computing device 101 or any devices in communication therewith or in a vicinity thereof, and may perform parsing of the audio input. For example, the image capture system may be configured to perform automatic speech recognition (ASR) to convert audio signals to a textual format. The image capture system may be configured to transcribe the audio input into a string of text using any suitable ASR technique. For example, one or more machine learning models may be employed, e.g., recurrent neural networks, bidirectional recurrent neural networks, LSTM-RUN models, encoder-decoder models, transformers, conditional random fields (CRF) models, and/or any other suitable model(s). Such one or more models may be trained to output one or more candidate transcriptions of the audio file or utterance. In some embodiments, in generating the candidate transcriptions, the voice processing application may analyze the received audio signal to identify phonemes (i.e., distinguishing units of sound within a term) within the signal, and utilize statistical probability techniques to determine most likely next phonemes in the received query. For example, the model may be trained on a large vocabulary of words, to enable the model to recognize common language patterns and aid in the ability to identify candidate transcriptions of voice input. Additionally or alternatively, transcription of the audio signal may be achieved by external transcription services (e.g., Amazon Transcribe by Amazon, Inc. of Seattle, WA and Google Speech-to-Text by Google, Inc. of Mountain View, CA). Techniques for transcribing audio are discussed, for instance, in U.S. patent application Ser. No. 16/397,004, filed Apr. 29, 2019, which is hereby incorporated by reference herein in its entirety.

In some embodiments, to convert audio input 108 to a corresponding textual description, the image capture system may utilize natural language processing (NLP) including natural language understanding (NLU), e.g., tokenization of the string of the audio input, stemming and lemmatization techniques, parts of speech tagging, domain classification, intent classification and named entity recognition with respect to the received audio input. In some embodiments, rule-based NLP techniques or algorithms may be employed to parse text included in the received audio signals. For example, NLP circuitry or other linguistic analysis circuitry may apply linguistic, sentiment, and grammar rules to tokenize words from a text string, and may perform chunking of the query, which may employ different techniques, e.g., N-gram extraction, skip gram, and/or edge gram; identify parts of speech (i.e., noun, verb, pronoun, preposition, adverb, adjective, conjunction, participle, article); perform named entity recognition; and identify phrases, sentences, proper nouns, or other linguistic features of the text string. In some embodiments, statistical natural language processing techniques may be employed. In some embodiments, a knowledge graph may be employed to discern relationships among entities. In some embodiments, one or more machine learning models may be utilized to categorize one or more intents of the audio input. In some embodiments, the NLP system may employ a slot-based filling pipeline technique and templates to discern an intent of captured audio signals which may correspond to input 108.

In some embodiments, computing device 101 may, additionally or alternatively to receiving input 108 in an audio format, receive input in a form other than audio input. For example, the image capture system may generate for display, at display 106 of computing device 101, template inputs for a user to choose from, or suggest optimal prompts based on analysis of a context of a current view, e.g., "Take a picture when everyone is smiling during sunset at the beach" or "Take a picture when the sun comes through the clouds at the beach" as input 108. In some embodiments, suggested descriptions for input may be determined based at least in part on a user's historical inputs, and/or inputs from other users in a similar context, e.g., at a beach setting. In some embodiments, computing device 101 may enable a user to input alphanumeric characters to instruct image sensor 102 to capture at least one image of a subject, and the instruction may comprise at least one criterion for the at least one image of the subject, as input 108.

As shown at 116, the image capture system may cause image sensor 102 to start automatically observing its environment, based on the input 108 received at 114. In some embodiments, the image capture system may cause image sensor 102 to observe its environment by capturing, based on input instruction 108, a plurality of captured images of the subject (e.g., the five users present at the beach, preparing to jump). For example, the image capture system may capture one or more images of the subject and transfers such captured images to transient memory, such as a buffer associated with image sensor 102 or computing device 101, or another storage location. For example, the image capture system may analyze the images transferred to the buffer to determine whether any of the captured images correspond, and/or a degree to which the captured images correspond, to the at least one criterion specified in input 108 ("Take a picture when everybody jumps"). In some embodiments, images deemed not to sufficiently correspond to the at least one input criterion may be discarded, e.g., removed from the buffer or overwritten by subsequently captured images. In some embodiments, one or more of the captured images deemed to sufficiently correspond to the at least one input criterion may be persistently stored, or such sufficiently corresponding image(s) may be presented to the user and the user may be provided with an option to instruct the image capture system to cause such sufficiently corresponding image(s) to be stored or transmitted. In some embodiments, observing a current scene captured by the image sensor may comprise constantly evaluating and/or analyzing match metrics as between the observed scene and a textual description corresponding to received input 108.

In some embodiments, the image capture system may utilize one or more of any suitable computer-implemented techniques (e.g., machine learning techniques, and/or a heuristic-based analysis), as described in more detail below, to determine whether actions or appearances or states of persons or animals, objects, landmarks or the natural world, in a currently captured or observed image or view, correspond to the at least one criterion described in received input 108. In some embodiments, in response to receiving input 108, the image capture system may be configured to automatically begin capturing images repeatedly, or at certain intervals, to check whether the subject and the at least one criterion specified in input 108 are currently present in the captured images. In some embodiments, in response to receiving the input 108, the image capture system may cause image sensor 102 to capture images with one or more modified parameters (e.g., at an increased frames per second (FPS) and decreased resolution).

In some embodiments, as described in more detail in connection with FIG. 2, the image capture system may determine an instruction vector based on the instruction corresponding to input 108, and may determine a captured image vector for each of the plurality of captured images of the subject. In some embodiments, the image capture system may begin a particular mode of image capture (e.g., corresponding to increasing an FPS or frequency of image capture) to capture images of the subject based on comparing one or more of the captured image vectors and the instruction vector. For example, if a comparison of the instruction vector and a given captured image vector (e.g., for a most recently captured image) indicates a correspondence score or match metrics above or below a certain threshold, the image capture system may determine that a current scene corresponds to the at least one criterion specified in association with the subject at input 108, and may begin capturing images in the particular mode. For example, such particular mode may correspond to adjusting (e.g., increasing) a frequency at which images are captured, adjusting (e.g., increasing) a resolution at which images are captured, or adjusting any other suitable parameter, or any combination thereof.

At 118, the image capture system may determine one or more corresponding images, from among the plurality of captured images. For example, as described in more detail in connection with FIG. 2, the image capture system may compare at least one captured image vector of the plurality of captured images with the instruction vector to determine one or more corresponding images from the plurality of captured images. In some embodiments, the image capture system may compare one or more characteristics of a captured image to one or more characteristics of a reference image (e.g., retrieved from a database, provided by a user or otherwise generated), which may correspond to a desired type of image, to determine a best correspondence in relation to the reference image.

In some embodiments, the one or more corresponding images may be provided to user 111. For example, the image capture system may generate for display the one or more corresponding images, to enable user 111 to review and/or navigate through the one or more corresponding images, and/or provide instructions regarding which of such one or more corresponding images should be stored (e.g., written to disk or persistent storage associated with image sensor 102 and/or computing device 101). In some embodiments, the image capture system may, upon determining that the currently observed view or scene no longer corresponds to the at least one criterion described by the input, or a time instance or time period of an optimal correspondence with the instruction of the input has passed, or that a certain number of images have already been captured and/or observed and/or analyzed, may cause the computing device 101 to cease capturing or observing or analyzing images, and/or to capture images in a different manner (e.g., at an adjusted frequency and/or resolution). In some embodiments, the image capture system may cause image sensor 102 to continue to observe the captured scene to detect whether the desired moment corresponding to the received input occurs again. In some embodiments, computing device 101 may prompt the user via a display of computing device 101 to evaluate one or more of the captured images corresponding to the at least one criterion specified in the input. For example, the image capture system may enable the user to input which of the one or more images he or she desires to store at computing device 101 or remote from computing device 101. In some embodiments, the image capture system may use the match metrics to search within the captured images and return the best one or more matches as the final output(s), while deleting, discarding, or overwriting (e.g., immediately or after a threshold period of time) intermediate data, which may correspond to other images determined to have a less optimal correspondence with the received input instruction 108.

In some embodiments, an optimal correspondence may occur one time, or may occur multiple times, in association with a particular received input. In some embodiments, the image capture system may capture multiple images, and/or may trigger a burst mode or other suitable mode (e.g., a mode in which images are captured at an increased frequency or higher FPS) multiple times, e.g., after a threshold period of time is detected to have elapsed since the prior instance or mode and/or if a correspondence score exceeds a threshold or a previous maximum correspondence score.

In some embodiments, the image capture system may be configured to combine a plurality of images captured in association with a particular received input, to compose an optimal image with various features determined to most closely correspond to the received input from across the multiple captured images. For example, if a particular person in a captured image is determined to have had his or her eyes closed in the image, or a particular person's jump is determined not to be synchronized in relation to the jump of other user's jumps, an optimal composite image may be generated to address these issues, e.g., modify the persons eyes to be open or modify the height of the person's jump in relation to other users. In some embodiments, such composite image may be automatically suggested to the user without the user requesting the composite image, or based on user input requesting the composite image to be generated. In some embodiments, the optimal image may be obtained by manipulating various features of the multiple captured images to obtain a better correspondence score.

Figure 2:
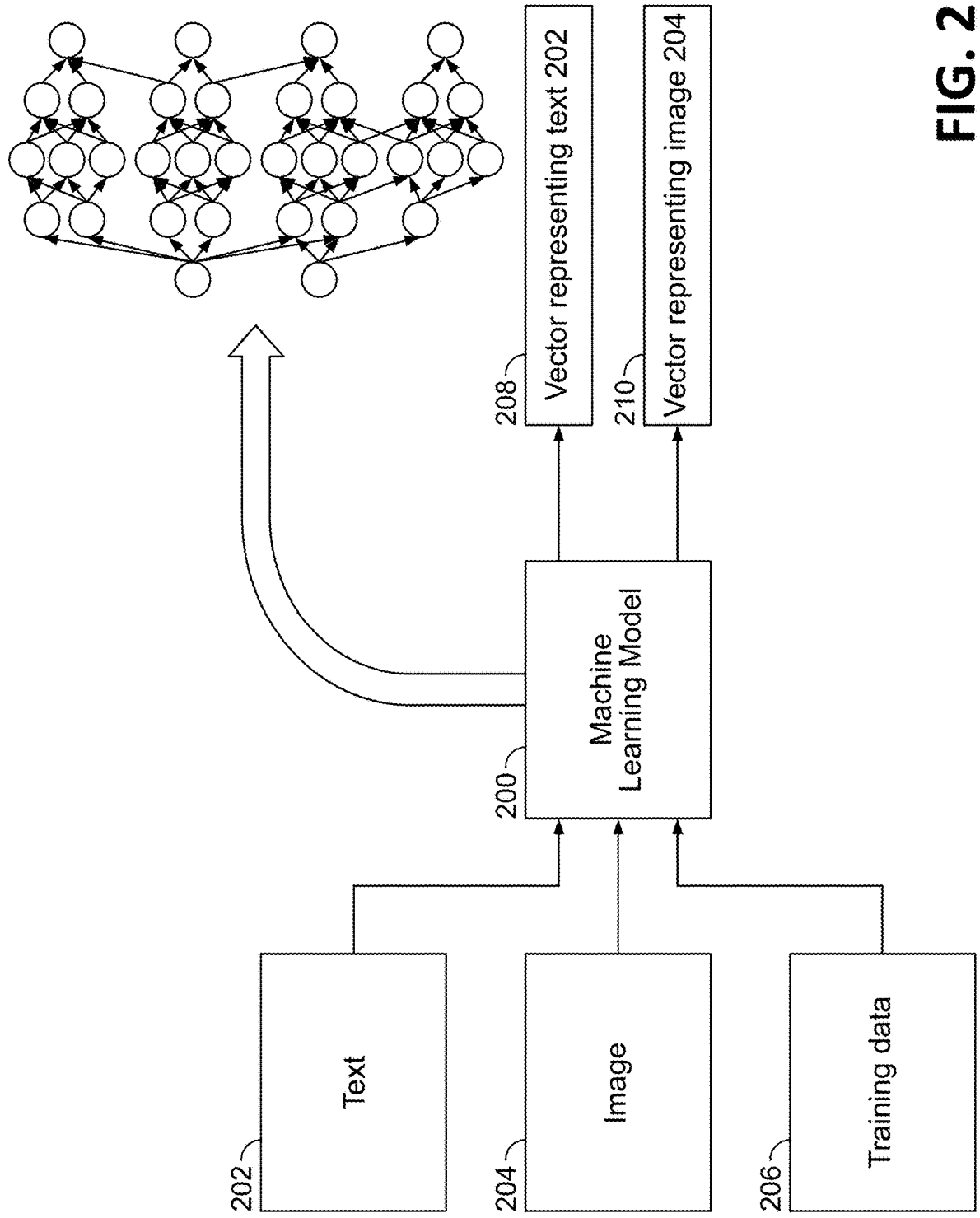
FIG. 2 is a block diagram of an illustrative machine learning model, in accordance with some embodiments of this disclosure.

FIG. 2 is a block diagram of an illustrative machine learning model 200, in accordance with some embodiments of this disclosure. In some embodiments, machine learning model 200 may be a neural network, a recurrent neural network, an image encoder, a text encoder, a transformer, a classifier, or any other suitable type of machine learning model, or any combination thereof. In some embodiments, machine learning model 200 may be trained to receive text 202 as input and output the text as a vector (or any other suitable numerical representation) 208 in a vector space, and machine learning model 200 may be trained to receive an image 204 as input and output the image as a vector 210 (or any other suitable numerical representation) in the vector space. Such vector space may enable correlations and comparisons between vectors encoding textual descriptions, and vectors representing images, within the same vector space. Vector 208 may correspond to an instruction vector, and vector 210 may correspond to a captured image vector. In some embodiments, machine learning model 200 may be trained using image and text pairs, as part of any suitable amount of training data 206. In some embodiments, machine learning model 200 may be used to obtain vector representations even for images and textual descriptions that model 200 has not been previously exposed to. In some embodiments, such techniques may enable avoiding the generating of an image from input text 202, which may help conserve computing resources and minimize latency in performing computations to identify a desired moment in relation to correspondence criteria specified in received input.

In some embodiments, machine learning model 200 may be implemented based at least in part on the techniques described in Radford et al., "Learning Transferable Visual Models From Natural Language Supervision," PMLR 139: 8748-8763, 2021, the contents of which is hereby incorporated by reference herein in its entirety; and/or based at least in part on the techniques described in Ramesh et al., "Zero-Shot Text-to-Image Generation," Proceedings of the 38th International Conference on Machine Learning, PMLR 139: 8821-8831, 2021, the contents of which is hereby incorporated by reference herein in its entirety. In some embodiments, machine learning model 200 may correspond to one or more sub-portions of one or more of the machine learning models discussed in Radford et al. and/or Ramesh et al., e.g., an encoder portion, which may enable faster processing of data to be performed as compared to a scenario in which the entirety of such models are implemented.

Machine learning model 200, input data 202 and 204, and training data 206 may be stored at any suitable device(s) of the image capture system. Machine learning model 200 may be implemented at any suitable device(s) of the image capture system. In some embodiments, model 200 may be trained "offline," such as, for example, at a server (e.g., server 904 of FIG. 9) remote from computing device 101, or at a third party. In some embodiments, model 200 may be implemented at such remote server, and/or abstracted by the image capture system (for example, as a set of weights or biases applied to a neural network) and transmitted (e.g., over network 909 of FIG. 9) to the user's computing devices, e.g., having the image capture application or image capture system installed or implemented thereon or provided thereto. For example, the local computing device may lack computational and/or storage resources to train the model from scratch. In some embodiments, each device may iteratively improve the machine learning model 200 locally and send the abstracted model and/or updates back to the server. In some embodiments, computing devices such as, for example, computing device 101 may be configured to locally implement machine learning model 200. In some embodiments, the same machine learning model may be used to vectorize text inputs and image inputs, or separate machine learning models may be used to vectorize text inputs and image inputs. For example, a first machine learning model may be configured to receive text input and output a vector encoding the text input, and a second machine learning model may be configured to receive image input and output a vector encoding the image input.

In some embodiments, machine learning model 200 may be trained by an iterative process of adjusting weights (and/or other parameters) for one or more layers of machine learning model 200. For example, the image capture system may input training data 206 (e.g., image and text pairings) into model 200, and obtain a vector representation for the image and/or text of the input. Such vectors may be compared to a ground truth value (e.g., an annotated indication of the correct input). The image capture system may then adjust weights or other parameters of machine learning model 200 based on how closely the output corresponds to the ground truth value. The training process may be repeated until results stop improving or until a certain performance level is achieved (e.g., until 95% accuracy is achieved, or any other suitable accuracy level or other metrics are achieved). In some embodiments, model 200 may be trained to learn features and patterns with respect to particular features of image or text inputs (e.g., certain types or categories of images or text) and corresponding vector representations thereof. Such learned patterns and inferences may be applied to received data once model 200 is trained. In some embodiments, model 200 may be trained or may continue to be trained on the fly or may be adjusted on the fly for continuous improvement, based on input data and inferences or patterns drawn from the input data, and/or based on comparisons after a particular number of cycles. In some embodiments, model 200 may be content-independent or content-dependent, e.g., may continuously improve with respect to certain types of content. In some embodiments, model 200 may comprise any suitable number of parameters, e.g., over 150 million, or any other suitable number of parameters.

In some embodiments, model 200 may be trained with any suitable amount of training data from any suitable number and/or types of sources. In some embodiments, machine learning model 200 may be trained by way of unsupervised learning, e.g., to recognize and learn patterns based on unlabeled data. In some embodiments, machine learning model 200 may be trained by supervised training with labeled training examples to help the model converge to an acceptable error range, e.g., to refine parameters, such as weights and/or bias values and/or other internal model logic, to minimize a loss function. In some embodiments, each layer may comprise one or more nodes that may be associated with learned parameters (e.g., weights and/or biases), and/or connections between nodes may represent parameters (e.g., weights and/or biases) learned during training (e.g., using backpropagation techniques, and/or any other suitable techniques). In some embodiments, the nature of the connections may enable or inhibit certain nodes of the network. In some embodiments, the image capture system may be configured to receive (e.g., prior to training) user specification of (or automatic selection of) hyperparameters (e.g., a number of layers and/or nodes or neurons in each model). The image capture system may automatically set or receive manual selection of a learning rate, e.g., indicating how quickly parameters should be adjusted. In some embodiments, the training image data may be suitably formatted and/or labeled by human annotators or otherwise labeled via a computer-implemented process. As an example, such labels may be categorized metadata attributes stored in conjunction with or appended to the training image data. Any suitable network training patch size and batch size may be employed for training model 200. In some embodiments, model 200 may be trained at least in part using images extracted from GIF files, to simulate multiple images captured in succession, or using any suitable technique to train model 200 to process a sequence of similar scenes more effectively. In some embodiments, model 200 may be trained at least in part using a feedback loop, e.g., to help learn user preferences over time.

In some embodiments, the image capture system may perform any suitable pre-processing steps with respect to training data, and/or data to be input to the trained machine learning model. In some embodiments, pre-processing may include causing an image to be input to be of a particular size or resolution (e.g., 224×224 pixels, or any other suitable size or resolution). In some embodiments, pre-processing may include causing text to be input to be of a particular size (e.g., 77 tokens long, or any other suitable token size). In some embodiments, pre-processing may include extracting suitable features from the training images and converting the features into a suitable numerical representation (e.g., one or more vector(s) and/or one or more matrices); normalization; resizing; minimization; brightening portions thereof; darkening portions thereof; color shifting the image among color schemes from color to grayscale; other mapping; cropping the image; scaling the image; adjusting an aspect ratio of the image; adjusting contrast of an image; and/or performing any other suitable operating on or manipulating of the image data; or any combination thereof. In some embodiments, the image capture system may pre-process image or text data to be input to the trained machine learning model, to cause a format of the input image or text data to match the formatting of the training data, or any other suitable processing may be performed, or any combination thereof.

Figure 3:
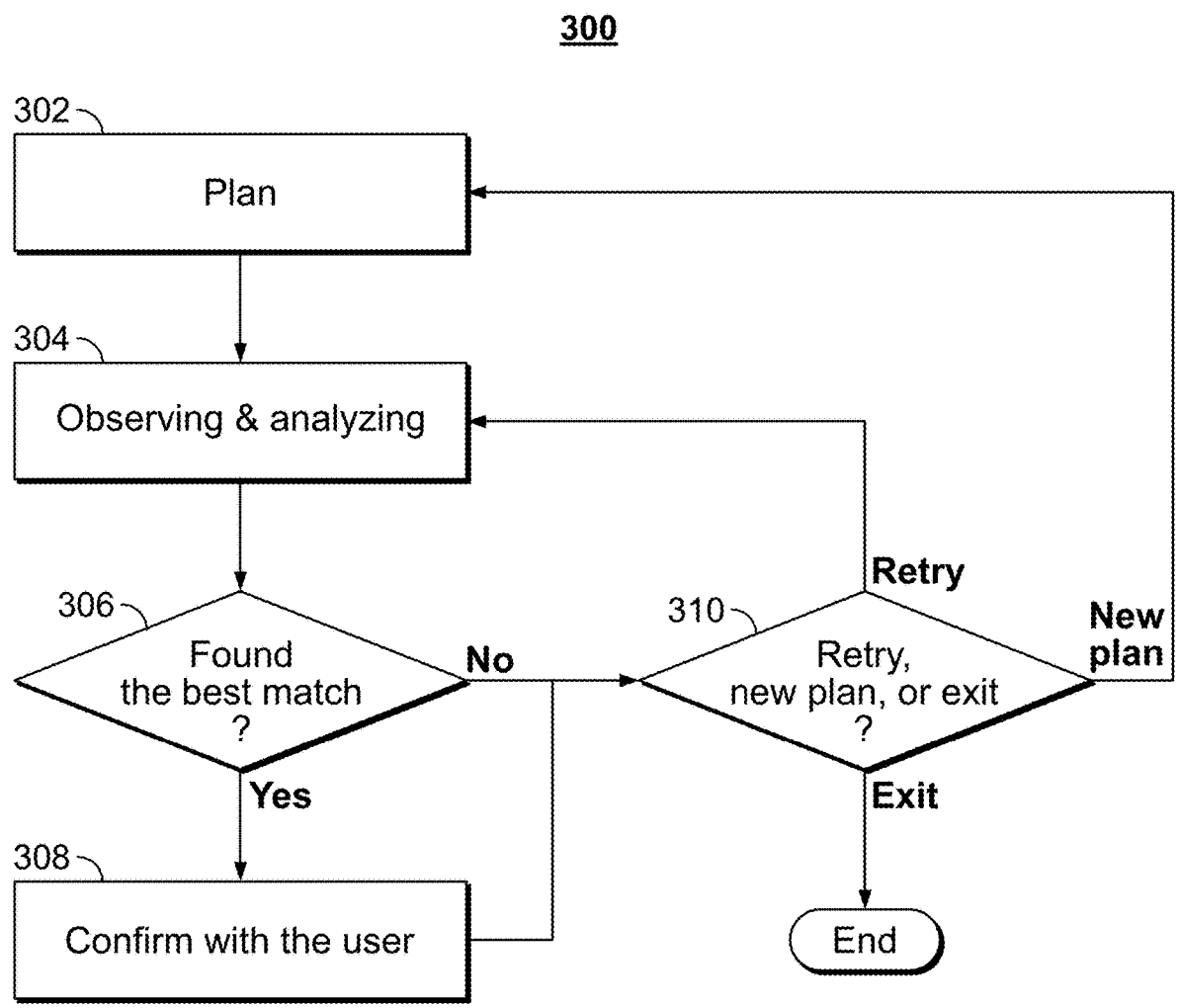
FIG. 3 depicts an illustrative flowchart for determining an image that corresponds to a received input instruction, in accordance with some embodiments of this disclosure.

FIG. 3 depicts an illustrative flowchart 300 for determining an image that corresponds to a received input instruction, in accordance with some embodiments of this disclosure. At 302, a plan, e.g., input 108 of FIG. 1, comprising an instruction for an image sensor to capture at least one image of a subject and the instruction comprising at least one criterion for the at least one image of the subject may be received at a computing device (e.g., computing device 101 of FIG. 1). In some embodiments, computing device 101 may be a stand-alone camera equipped with a voice input system and/or or other input system, or computing device 101 may be a device having a camera built in, e.g., a smartphone or other mobile device, or any other suitable computing device. In some embodiments, computing device 101 may receive input from the user indicating an intention to provide the plan indicated at 302 as input, e.g., selection of a user interface element or hardware button, or detecting a wake word such as, for example, "Hi Camera," or pointing of the camera towards a scene, or any other suitable input. In some embodiments, the plan indicated at 302 may be received via a secondary device, e.g., a smartwatch in communication with computing device 101.

In some embodiments, the plan indicated at 302 may be received in any suitable form, e.g., text or tactile input, in addition or in the alternative to voice input. For example, computing device 101 may receive from the user input alphanumeric characters, e.g., via a touch screen or keyboard, specifying a desired moment to be captured, or the user may be provided with various selectable options, e.g., templates with text embeddings as metadata, which may be generated based on being relevant to a current context and/or based on historical patterns of the user or other users. In the case of receiving voice input as the plan indicated at 302, the image capture system may use one or more of the techniques discussed herein to convert the voice input to text and interpret the text, e.g., using ASR and NLP techniques, to obtain a textual form of the plan indicated at 302.

In some embodiments, the received input corresponding to the plan may comprise an action (e.g., an instruction for an image sensor to capture at least one image of a subject) and a description (e.g., the instruction comprising at least one criterion for the at least one image of the subject). For example, the action may correspond to any output the camera is capable of generating, e.g., an image, a photo, a picture, a live photo, a video, a movie, a recording, a slow motion video, a panorama photo, burst mode images, images from another type of mode, or any other suitable output, or any combination thereof. In some embodiments, the image capture system may by default interpret a request to capture an image as a high resolution image, or any other suitable type of image. In some embodiments, the image capture system may be configured to extract and/or interpret keywords, e.g., "live photo" or "video," from the input, in order to instruct the camera of computing device 101 as to which type of image is to be obtained. In some embodiments, each of the types of images may be specified in storage or memory of computing device 101 and/or a remote server (e.g., server 904 of FIG. 9), for reference when input is received, to determine which type of image should be captured. In some embodiments, any suitable number of potential phrases or instructions may be enumerated in advance in storage or memory of computing device 101 or server 904, with non-limiting illustrative examples being shown below.

Take|make|capture + $\begin{cases} \text{A [picture|photo|shot]} \\ \text{A live [picture|photo|shot]} \\ \text{A panorama [picture|photo|shot]} \\ \text{A [video|movie|recording]} \\ \text{A slo-mo [video|movie|recording]} \end{cases}$ In some embodiments, the at least one criterion included in the received input may describe the desired moment for the camera to capture. As non-limiting examples, the description may correspond to "Take a picture when the baby makes a funny face," or "Take a picture when a group of people jumps together." In some embodiments, the image capture system may capture contextual information to supplement the received description with more details. For example, the image capture system may determine, based on analyzing the view of the environment being captured (e.g., at 112 of FIG. 1) and/or other information (e.g., received from a weather service or application, a GPS system, social network application, or any other suitable source), to add a description of "sunny day" and "beach" to the received input, which may result in a modified description of "On a sunny day, take a picture when a group of people jumps together at the beach." The generation of a more robust description may help to find a better correspondence when comparing a vector representing the description with a vector representing an image of a view being captured. In some embodiments, the description, which may or may not include a supplemental description determined based on a current context, may be vectorized, as discussed in more detail in FIG. 4.

At 304, the image capture system, which may have determined vector T representing the received plan or input (e.g., "Take a picture when everybody jumps"), may begin observing and analyzing one or more images of the subject captured by image sensor 102, based on the received input at 302. In some embodiments, at 304, the image capture system may cause image sensor 102 to enter an observing mode once the input is received at 302, and entering such observing mode may comprise causing one or more parameters of image sensor 102 to be modified, e.g., increasing a frequency of image capture to a high FPS and/or decreasing a resolution for the observed captured images. In some embodiments, a buffer memory of computing device 101 and/or image sensor 102 may store each image or frame captured by computing device 101, and each frame in the buffer memory may be analyzed to determine whether the frame corresponds to the at least one criterion specified by the input at 302. For example, the buffer memory may be a framebuffer, of any suitable storage capacity, associated with image sensor 102 and/or computing device 101. In some embodiments, the speed of such analysis may be enhanced due to such analysis being performed in the buffer memory as opposed to persistently storing such observed images, e.g., written to disk of computing device 101, which may be a slower process prior to allowing for analysis of the image. In some embodiments, the low resolution of the images captured at 304 may contribute to a faster analysis process.

In some embodiments, in the observing mode, a predefined timeout may be utilized, e.g., if the desired moment described by the input is determined as likely to occur shortly. In some embodiments, the image capture system may enable a user to manually enable or disable such particular mode, e.g., via a user interface element, a hardware button or keypad, a voice command, a gesture, or any other suitable input, or any combination thereof. In some embodiments, a user may specify in his or her profile preferences a preferred duration of the observing mode.

Figure 5A:
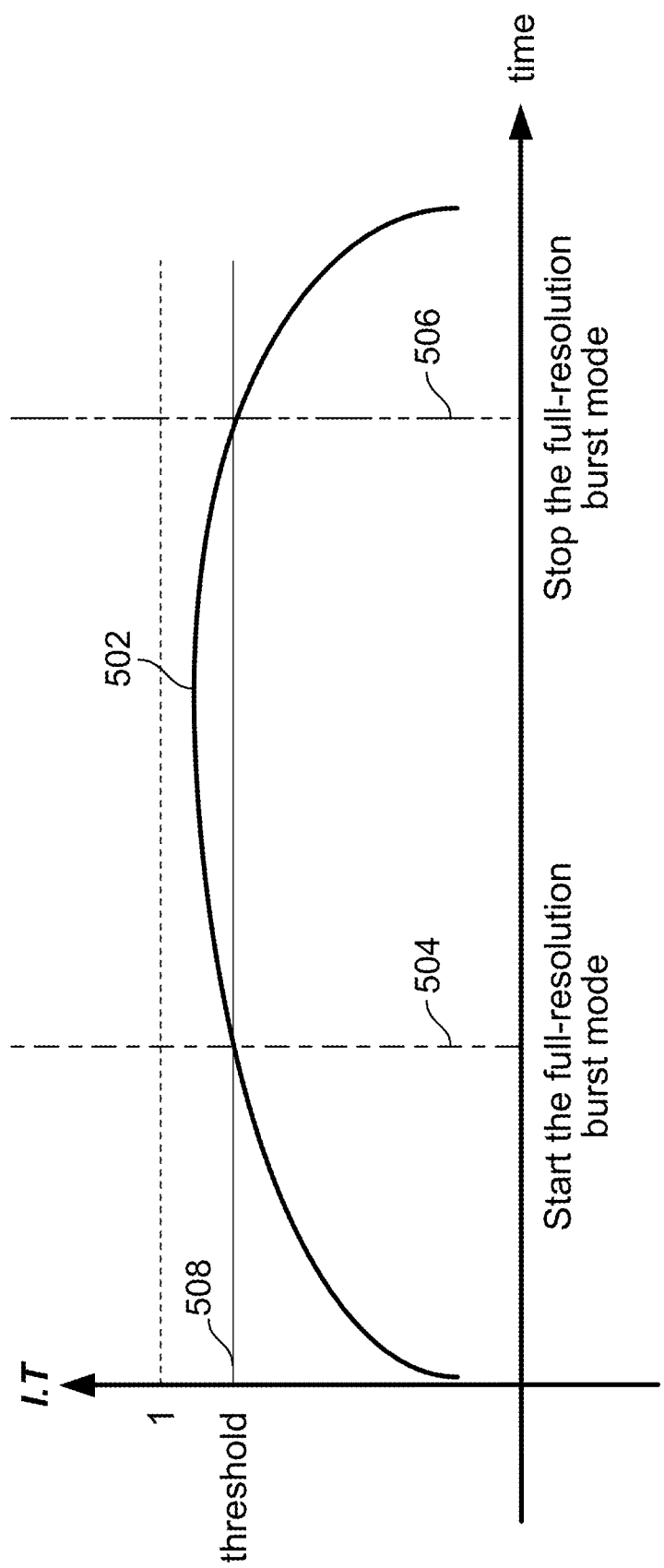
FIGS. 5A-5B depict illustrative techniques for comparing a captured image vector and an instruction vector to determine a corresponding image, in accordance with some embodiments of this disclosure.
Figure 5B:
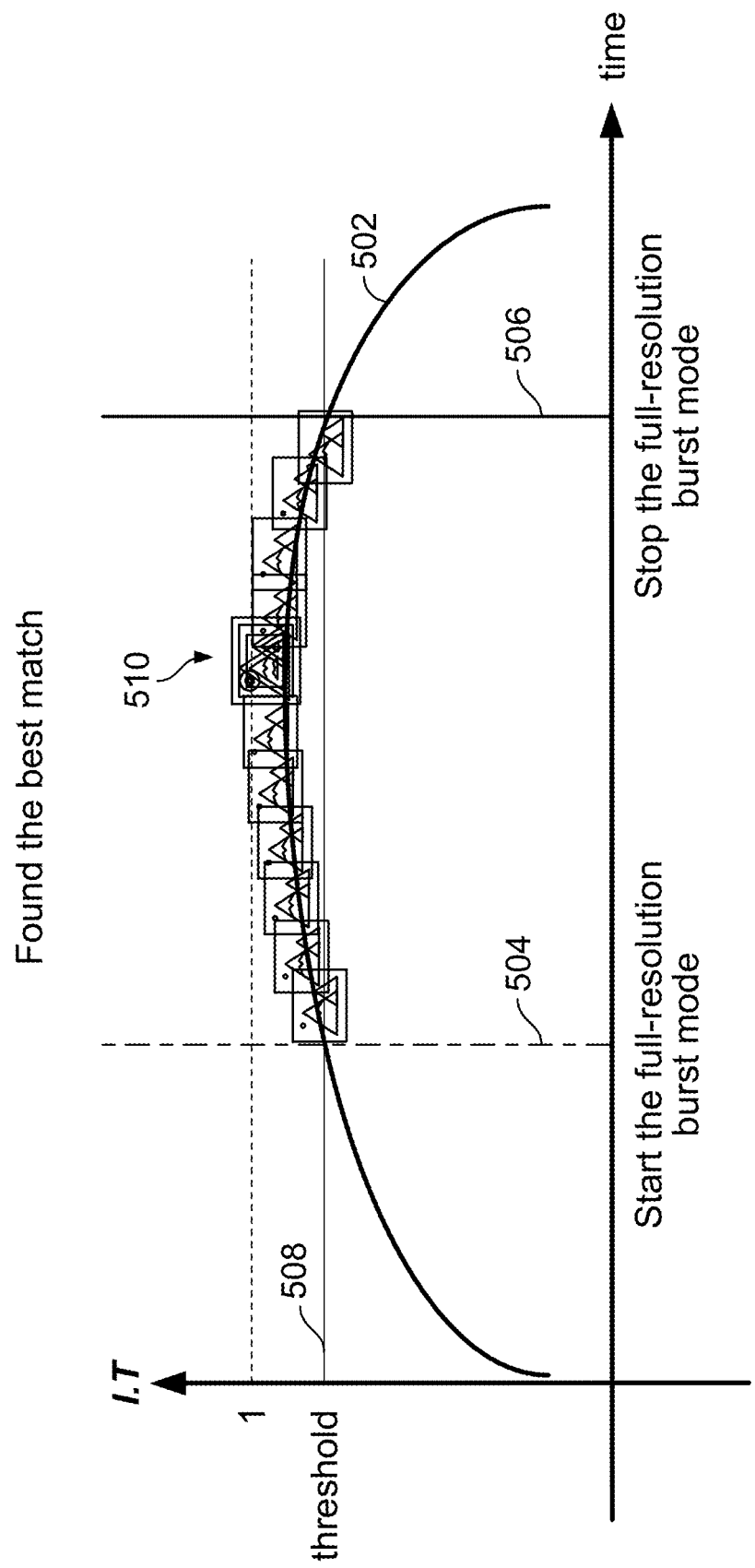

In some embodiments, each captured image frame may be vectorized to vector I using machine learning model 200 of FIG. 2, which may output a continuous stream of captured image vectors $[I_1, I_2, \ldots I_n]$, where n is the current frame or timestamp, for comparison with instruction vector T. In some embodiments, the image capture system may determine whether one or more correspondences have been identified between the instruction vector T representing the input text and one or more of the continuous stream of captured image vectors $[I_1, I_2, \ldots I_n]$ captured by image sensor 102 over time. In some embodiments, this may be achieved by performing an inner product operation, as shown in FIG. 4, as between vector T and each vector I in the continuous stream in the stream $I(n)=[I_1, I_2, \ldots I_n]$, as shown in FIGS. 5A-5B.

FIG. 4 depicts an illustrative technique for comparing a captured image vector and an instruction vector to determine an image that corresponds to a received input instruction, in accordance with some embodiments of this disclosure. As shown in FIG. 4, once machine learning model 200 of FIG. 2 is trained, a text description input to model 200 may be encoded as a vector T (or any other suitable numerical representation), and an image input to model 200 may be encoded as a vector I (or any other suitable numerical representation), and each of vectors T (e.g., an instruction vector) and I (e.g., a captured image vector) may correspond to a same vector space 400. Vector I and vector T may contain any suitable number of dimensions. In some embodiments, vector T may correspond to an encoding of text input 108, and vector I may correspond to an encoding of the observed image shown at interface 112 or interface 114.

In some embodiments, the image capture system may determine whether vectors T and I are sufficiently similar using any suitable technique. For example, the image capture system may determine whether vectors T and I are sufficiently similar based on performing an inner product operation I·T (or a cosine similarity operation as between I and T) to determine whether the inner product exceeds a threshold; if so, may determine that the text input and image input are sufficiently similar. In some embodiments, the vectors T and I may be normalized to a unit length, such that the angle between the vectors, the angle's cosine, or the dot product (which is the same as the cosine for normalized vectors) each indicate how similar the vectors are to each other. For example, identical vectors yield a value of zero degrees for the angle between the vectors, which is equivalent to a cosine or dot product of a value of one; if two vectors are perpendicular, these vectors may be considered unrelated to each other, e.g., an angle of 90 degrees which is equivalent to a cosine and dot product of zero. In some embodiments, a magnitude of the vectors may be taken into account, in addition or in alternative to the angles of the vectors, when determining similarity between the vectors.

In some embodiments, as the value obtained from the inner product operation increases (e.g., a cosine similarity value approaching a value of one), the image capture system may determine that an increasingly better correspondence exists between the captured image vector and the instruction vector. In some embodiments, the image capture system may compare the cosine similarity value to a threshold value, and identify a correspondence between the captured image vector and the instruction vector when the cosine similarity value exceeds the threshold value. In some embodiments, a smaller angle between the vectors may be indicative of a better correspondence. In some embodiments, the image capture system may compare one or more respective angles created by comparing the instruction vector and the captured image vectors to a threshold value, and identify a correspondence between a particular captured image vector and the instruction vector when the angle is below a threshold value.

In some embodiments, based on the comparison between the continuous stream of captured image vectors $[I_1, I_2, \ldots I_n]$ and instruction vector T, the image capture system may determine a plurality of angles, each angle of the plurality of angles comprising an angle created by a respective captured image vector and the instruction vector. One or more corresponding images from the plurality of captured images may be determined based on the corresponding angle of the plurality of angles that is smallest or that is less than a threshold. In some embodiments, as such angles decrease, the FPS at which images are captured may be adjusted (e.g., increased), and/or a resolution at which images are captured may be adjusted (e.g., increased).

FIGS. 5A-5B depict illustrative techniques for comparing a captured image vector and an instruction vector to determine a corresponding image, in accordance with some embodiments of this disclosure. As shown in FIG. 5A, curve 502 illustrates a stream of scalar values resulting from the inner product of each captured image vector I (in the stream and corresponding to images captured over time) and the instruction vector T representing the input textual description, e.g., $I(n) \cdot T = [I_1 \cdot T, I_2 \cdot T, \ldots I_n \cdot T]$. In some embodiments, the image capture system may be configured to apply smoothing techniques (e.g., Kalman filtering or any other suitable technique) to filter out unwanted noise or jitters.

As shown in FIG. 5A, the image capture system may determine, based on determining that the value of I·T (which may be referred to as a correspondence score) passes a predefined threshold 508 (at time point 504), that the view or scene being captured by a camera of computing device 101 sufficiently matches the textual description associated with input 302. In some embodiments, in response to determining that the value of I·T passes a predefined threshold 508 (at time point 504), the image capture system may cause a burst mode to be started, which may cause image sensor 102 to begin capturing full resolution images, e.g., as compared to in the observing mode. In some embodiments, since the observing mode may only need to access the aforementioned framebuffer, the observing mode may continue to be performed in parallel with the burst mode, and the burst mode may be performed for any suitable duration. For example, the capturing of images as part of the burst mode may be performed in parallel with the computation of angles between the instruction vector T and captured image vectors I of such captured images.

In some embodiments, the adjustment of the frequency of image capture, or FPS, such as, for example, when curve 502 rises above the threshold (e.g., during the burst mode), can be dynamically adjusted according to the trend of I(n)·T with respect to time or frame n. For example, in the FIGS. 5A-5B, when the image capture system may, upon determining that curve 502 is likely approaching a peak value (e.g., 1) of I(n)·T (or that curve 502 has exceeded the threshold), cause FPS to be increased, since the desired moment may be imminent or presently occurring. As shown below, the FPS may be inversely proportional to the slope of I(n)·T with respect to the time or frame n. For example, when curve 502 flattens, the FPS may be increased. In some embodiments, the FPS can be dynamically adjusted to save computing resources based on the observation that, near the top of curve 502, more sampling points may provide better accuracy.

$$FPS \propto \left\| \frac{1}{T \cdot \frac{d(I(n))}{dn}} \right\|$$

As shown in FIG. 5B, the image capture system may determine that curve 502, representing I·T over time, may reach the maximum point 510, which may correspond to a time point when the captured image most closely corresponds to the at least one criterion of the instruction of the input received at 302. The image capture system may determine that curve 502 subsequently drops back below threshold 508, e.g., at timepoint 506, at which point the image capture system may cease the performance of the burst mode and/or the observing mode. For example, after 506, the image capture system may stop capturing images or may capture images at a decreased FPS and/or a decreased resolution and/or other suitable adjusted parameters.

In some embodiments, step 304 may cease being performed after a threshold period of time (e.g., 30 seconds or any other suitable time period) expires without identifying a sufficient correspondence between captured views of the environment and the input received at 302. In some embodiments, step 304 may be performed until input from the user is received to cease performing step 304 or until a sufficient correspondence is identified. In some embodiments, computing device 101 may notify the user that a correspondence has not been identified after a threshold period of time, and may prompt the user to provide a modified input describing criteria to be detected in the environment and/or provide suggested inputs to the user. In some embodiments, a user may specify in his or her profile preferences how long the step 304 should be performed for identifying a correspondence before such mode is ceased to be performed.

In some embodiments, the capturing of images may continue to be performed even after the computation of angles between the instruction vector T and the plurality of captured image vectors I concludes, or the computation of angles between the instruction vector T and the plurality of captured image vectors I may continue to be performed even after the capturing of images concludes. In some embodiments, a number of images captured during the time period spanning 504 to 506 may correspond to a predefined number, or images may continue to be captured until curve 502 drops below the threshold, or until input is otherwise received from the user. In some embodiments, if curve 502 drops below the threshold at 506, the image capture system may monitor whether curve 502 subsequently rises above the threshold again, and if so, may resume the capturing of images as correspondence candidates.

At 306, the image capture system may identify a single best corresponding image, or two or more of the best correspondence images, from among the captured images in relation to the at least one input criterion associated with the subject. For example, one or more of the corresponding images may be determined based on being associated with a smallest angle(s) (or an angle value below a threshold) when comparing the captured image vector for such image and the instruction vector. In some embodiments, such as if the observing mode and the burst mode are performed at least in part in parallel, a maximum I·T value determined in the observing mode and a closest full-resolution image may be output from the burst mode. In some embodiments, if the observing mode is turned off during the burst mode, then I·T may be computed using the full-resolution images captured in the burst mode. In some embodiments, such best correspondence image(s) may be determined from images captured during a time period (e.g., performance of the full-resolution burst mode between 504 and 506) prior to I·T dropping below the threshold 508.

In some embodiments, if curve 502 does not exceed the threshold but is relatively close, e.g., comes within a threshold value from the threshold 508 over a certain time period, the image capture system may cause computing device 101 to perform certain actions such as, for example, controlling a parameter of image sensor 102. For example, the image capture system may cause computing device 101 to activate an optical or digital zoom when capturing images; blur the background or extraneous portions of the images or images to be captured, in relation to the subject and the at least one criterion; perform an automatic zoom or automatic focus or automatic tracking technique; or perform any other technique; or any combination thereof, in an effort to assist in capturing an image that is an optimal correspondence between the captured images and the at least one criterion. In some embodiments, the image capture system may identify the best correspondence or one of the relatively better correspondences based at least in part on an image having an object more focused or depicted more clearly as compared to other captured images.

While step 306 may be performed at least in part using machine learning model 200, in some embodiments, any suitable computer-implemented technique in which text and image are vectorized to the same vector space may be employed. In some embodiments, at 306, the image capture system may generate an image using model 200 based on textual input, may compare the generated image to images captured by computing device 101, and may determine whether a correspondence is present by comparing one or more characteristics of the generated image to the captured image, e.g., based on whether a correspondence score exceeds a threshold value. In some embodiments, the image capture system may employ a heuristic-based analysis (e.g., determining similarity between captured images by identifying objects in the image and comparing characteristics of such objects to known characteristics of objects stored in a database).

Figure 6:
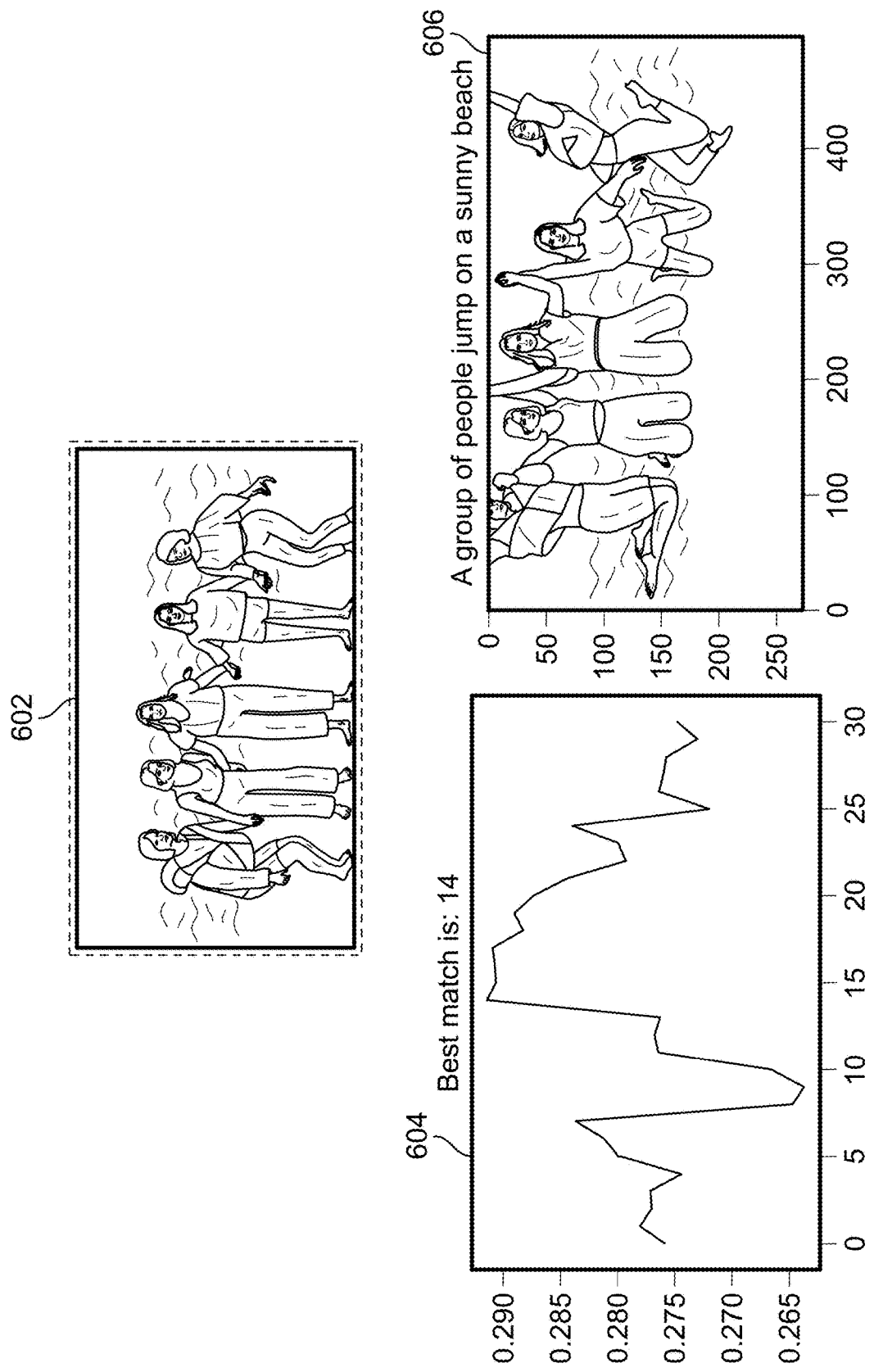
FIG. 6 depicts an illustrative technique for causing an image sensor to capture images of a subject, in accordance with some embodiments of this disclosure.

FIG. 6 depicts an illustrative technique for causing an image sensor to capture images of a subject, in accordance with some embodiments of this disclosure. As shown in FIG. 6, image 602 may correspond to an initial image that is captured after receiving the input of "take a picture of a group of people jumping on a sunny beach." The image capture system may begin to capture images as candidates for corresponding to the input when the correspondence score exceeds a threshold score, e.g., a threshold score of 0.280 (which corresponds to a cosine similarity value), or any other suitable value, shown on graph 604. Graph 604 includes an x-axis of a frame or image index and a y-axis of the cosine similarity value (e.g., a correspondence score) between a respective captured image vector and instruction vector. Image 602 may correspond to a relatively low correspondence score, e.g., towards a left-hand portion of graph 604. Image 606 may be captured by computing device 101, e.g., for persistent storage, and provided to the user, based on being a best correspondence for the received input. For example, image 606 may correspond to a captured image having a maximum cosine similarity value greater than 0.290.

While FIG. 6 depicts the image capture system being used to capture images of users jumping on a beach, the image capture system may be used to capture any other suitable environment, e.g., a figure skater jumping high, a figure skater falling down to the ground, a whale jumping out of the water, a soccer ball being kicked, a man kicking the soccer ball on a soccer field, an eagle flying with a fish in its talons, or a horse jumping over hurdles. In some embodiments, the threshold may be selected based at least in part on a type of images being captured and/or the received input and/or user preferences. For example, it may be desirable to use a lower threshold for input of "a whale jumping out of the water," since an image of any sighting of a whale may be desirable given the rarity of its occurrence, whereas "a soccer ball being kicked," may be assigned a higher threshold since such action may be more commonplace during a soccer game.

At 308, the image capture system may prompt the user to confirm which of the one or more images determined to be a best correspondence should be stored or otherwise selected. In some embodiments, step 308 may be optional, e.g., the one or more images determined to be a best correspondence at 308 may be automatically stored or otherwise selected without further user input instructing the image capture system regarding the storage of such one or more images.

Figure 7:
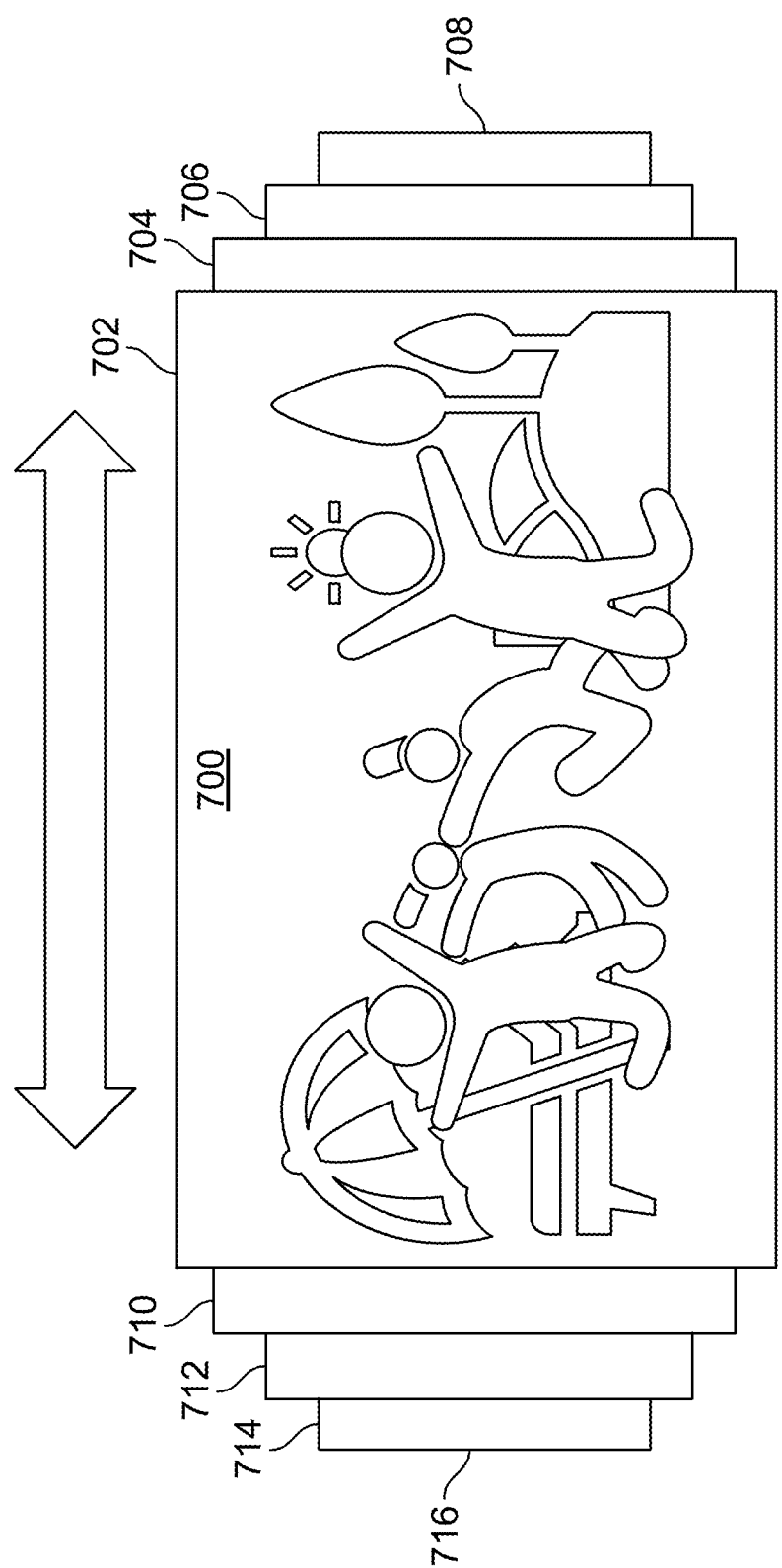
FIG. 7 depicts an illustrative user interface for viewing captured images, in accordance with some embodiments of this disclosure.

FIG. 7 depicts an illustrative user interface 700 for viewing captured images, in accordance with some embodiments of this disclosure. In some embodiments, user interface 700 may be provided via a display of computing device 101. Image 702 may correspond to a best correspondence from among the images captured based on matching the criteria specified by the received input at 302 of FIG. 3. In some embodiments, images 704, 706, 708, 710, 712, 714 and 716 may correspond to sub-optimal matches, e.g., images captured prior to curve 502 of FIGS. 5A-5B reaching its peak. User interface 700 may permit the user to navigate through and select certain of sub-optimal images 704-716 for storage or other use. In some embodiments, images 704-716 may be ordered based on a highest correspondence score, e.g., images closer to best correspondence image 702 in scrolling distance may have higher correspondence scores than images farther in scrolling distance from image 702.

Processing may proceed to 310 upon determining the user has not confirmed any of the captured images and/or upon determining that one or more best matches were not captured. At 310, the image capture system may determine whether to continue observing and analyzing the view of the environment in relation to the input received at 302, whether to wait for or prompt the user for new input at 302, or otherwise to exit the camera application of the image capture system or display the best match(es) images to the user. For example, if curve 502 fails to reach the threshold shown in FIGS. 5A-5B, the image capture system may not capture any images (as candidate for a best match) of the view of the environment, and/or may prompt the user to provide new input describing criteria based on which an image should be captured and/or provide a notification to a user indicating that no views of the environment were deemed to be a sufficient match to justify capturing an image based on the received input. In some embodiments, at 310, the image capture system may provide for user review the closest matches of captured images captured at times that were relatively close to, albeit short of, the threshold of FIGS. 5A-5B.

Figure 9:
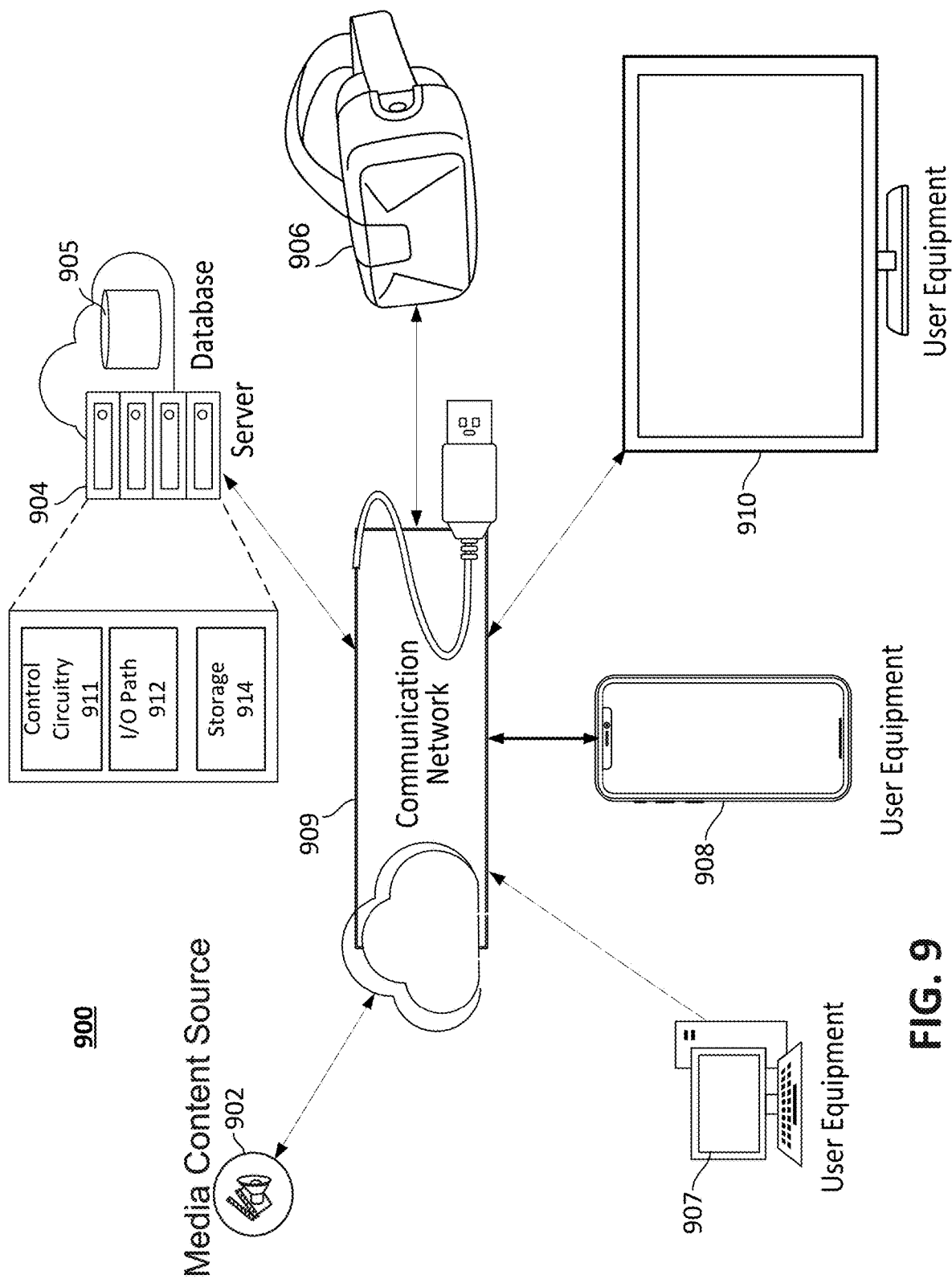

In some embodiments, one or more of steps 302-310 of FIG. 3 may be performed at least in part by computing device 101 and/or a remote server (e.g., server 904 of FIG. 9) in communication with a computing device over a network (e.g., network 909 of FIG. 9). In some embodiments, each of steps 302-310 of FIG. 3 may be performed locally at computing device 101. Machine learning model 200 may be transmitted to computing device 101, to perform the generation of vectors corresponding to text inputs and image inputs, respectively. As a non-limiting example, model 200 may be compressed from 350 MB to 48 MB at single-precision floating-point format (FP32), or model 200 may be compressed from 350 MB to 24 MB half-precision floating-point format (FP16). In some embodiments, processing speed may be enhanced, since the image capture system may utilize an encoder to vectorize text and image inputs, without having to generate an image. In some embodiments, the image capture system may compute a vector for a first captured image, and may utilize an embedding vector of subsequent frames that can be updated with incremental changes or residual relative to the initially captured image.

In some embodiments, the input received at 302 may specify multiple options, e.g., "Take a picture when the baby laughs or cries." In such example, the image capture system may parse (e.g., using NLP techniques) this input into two parallel descriptions, e.g., "the baby laughs," and "the baby cries," and track each match metric independently in the capture images. For example, the image capture system may apply the inner product operation to a first instruction vector representing "the baby laughs" and a captured image vector representing a current frame, and in parallel may apply the inner product operation to a second instruction vector representing "the baby cries" and a captured image vector representing a current frame, and may capture an image if a respective curve (e.g., as shown in FIGS. 5A-5B) for the inner products exceeds a threshold.

In some embodiments, each captured image may be overlayed with a user interface element indicating a corresponding at least one criterion for the image, for ease of review by the user. In some embodiments, input received at 302 associated with all desired moments that should be captured by computing device 101 may be specified in advance, e.g., via a voice input, text input or any other suitable input, or any combination thereof. In such an example, the image capture system may utilize multiple parallel streams with vectors $T_1, T_2, \ldots, T_m$, observed in parallel by image sensor 102:

$$I(n) \cdot T_1 = [I_1 \cdot T_1, I_2 \cdot T_1, I_3 \cdot T_1, \ldots I_n \cdot T_1].$$
$$I(n) \cdot T_2 = [I_1 \cdot T_2, I_2 \cdot T_2, I_3 \cdot T_2, \ldots I_n \cdot T_2].$$
$$I(n) \cdot T_m = [I_1 \cdot T_m, I_2 \cdot T_m, I_3 \cdot T_m, \ldots I_n \cdot T_m].$$

In some embodiments, the image capture system described herein may be applied to videos. For example, the image capture system may be utilized by a filmmaker or other content producer to automatically plan, capture, and cut the desired segments according to a film script or other input. As another example, the image capture system described herein may be used in video surveillance applications. For example, a security camera may be provided with an input of "Take a picture when somebody opens the front door" or "Take a picture of a raccoon in a trash can," and the image capture system may observe and capture images with the security camera determined to sufficiently correspondence to the at least one criterion specified by the input.

Figure 8:
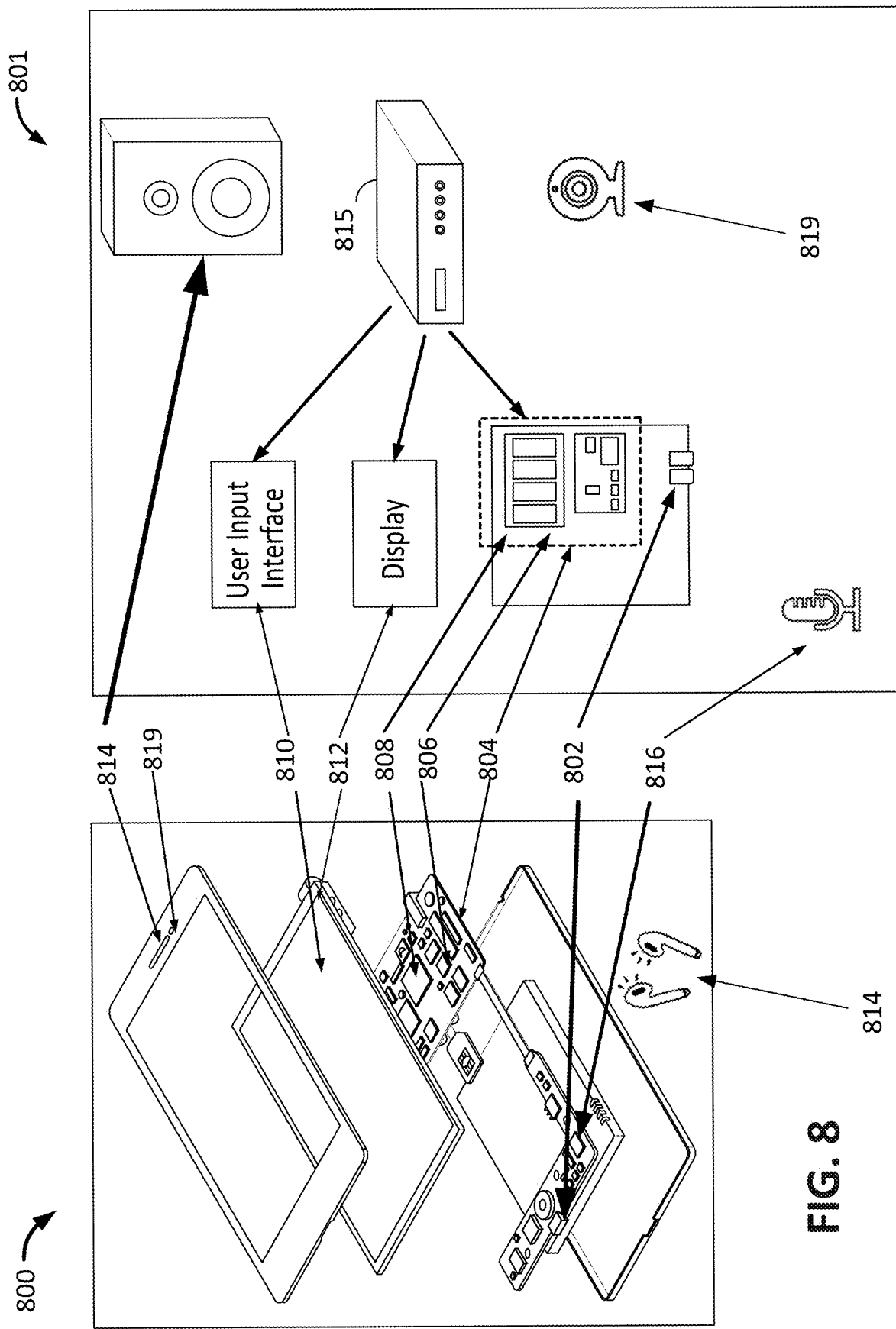
FIGS. 8-9 depict illustrative devices, systems, servers, and related hardware for causing an image sensor to capture images of a subject, in accordance with some embodiments of this disclosure.

FIGS. 8-9 depict illustrative devices, systems, servers, and related hardware for causing an image sensor to capture images of a subject, in accordance with some embodiments of this disclosure. FIG. 8 shows generalized embodiments of illustrative computing devices 800 and 801, which may correspond to, e.g., computing device 101 of FIG. 1, or any suitable computing device. For example, computing device 800 may be a camera, a smartphone device, a tablet, a near-eye display device, a VR or AR device, or any other suitable device capable of capturing imagery, or any combination thereof. In another example, computing device 801 may be a user television equipment system or device. Computing device 801 may include set-top box 815. Set-top box 815 may be communicatively connected to microphone 816, audio output equipment (e.g., speaker or headphones 814), and display 812. In some embodiments, microphone 816 may receive audio corresponding to a voice of a video conference participant and/or ambient audio data during a video conference. In some embodiments, display 812 may be a television display or a computer display. In some embodiments, set-top box 815 may be communicatively connected to user input interface 810. In some embodiments, user input interface 810 may be a remote control device. Set-top box 815 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of computing devices are discussed below in connection with FIG. 9. In some embodiments, computing device 800 may comprise any suitable number of sensors (e.g., gyroscope or gyrometer, or accelerometer, etc.), and/or a GPS module (e.g., in communication with one or more servers and/or cell towers and/or satellites) to ascertain a location of computing device 800. In some embodiments, computing device 800 comprises a rechargeable battery that is configured to provide power to the components of the computing device.

Each one of computing device 800 and computing device 801 may receive content and data via input/output (I/O) path 802. I/O path 802 may provide content (e.g., broadcast programming, on-demand programming, Internet content, content available over a local area network (LAN) or wide area network (WAN), and/or other content) and data to control circuitry 804, which may comprise processing circuitry 806 and storage 808. Control circuitry 804 may be used to send and receive commands, requests, and other suitable data using I/O path 802, which may comprise I/O circuitry. I/O path 802 may connect control circuitry 804 (and specifically processing circuitry 806) to one or more communications paths (described below). I/O functions may be provided by one or more of these communications paths, but are shown as a single path in FIG. 8 to avoid overcomplicating the drawing. While set-top box 815 is shown in FIG. 8 for illustration, any suitable computing device having processing circuitry, control circuitry, and storage may be used in accordance with the present disclosure. For example, set-top box 815 may be replaced by, or complemented by, a personal computer (e.g., a notebook, a laptop, a desktop), a smartphone (e.g., computing device 800), an AR or VR device, a tablet, a network-based server hosting a useraccessible client device, a non-user-owned device, any other suitable device, or any combination thereof.

Control circuitry 804 may be based on any suitable control circuitry such as processing circuitry 806. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 804 executes instructions for the image capture system stored in memory (e.g., storage 808). Specifically, control circuitry 804 may be instructed by the image capture system to perform the functions discussed above and below. In some implementations, processing or actions performed by control circuitry 804 may be based on instructions received from the video communication application.

In client/server-based embodiments, control circuitry 804 may include communications circuitry suitable for communicating with a server or other networks or servers. The image capture system may be a stand-alone application implemented on a computing device or a server. The image capture system may be implemented as software or a set of executable instructions. The instructions for performing any of the embodiments discussed herein of the image capture system may be encoded on non-transitory computer-readable media (e.g., a hard drive, random-access memory on a DRAM integrated circuit, read-only memory on a BLU-RAY disk, etc.). For example, in FIG. 8, the instructions may be stored in storage 808, and executed by control circuitry 804 of a computing device 800.

In some embodiments, the image capture system may be a client/server application where only the client application resides on computing device 800 (e.g., computing device 101 of FIG. 1), and a server application resides on an external server (e.g., server 904 of FIG. 9). For example, the image capture system may be implemented partially as a client application on control circuitry 804 of computing device 800 and partially on server 904 as a server application running on control circuitry 911. Server 904 may be a part of a local area network with one or more of computing devices 800, 801 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 904 and/or an edge computing device), referred to as "the cloud." Computing device 800 may be a cloud client that relies on the cloud computing capabilities from server 904 to determine whether a captured image corresponds to at least one criterion specified in input received from a user. When executed by control circuitry of server 904, the image capture system may instruct control circuitry 811 to perform such tasks. The client application may instruct control circuitry 804 to determine such tasks.

Control circuitry 804 may include communications circuitry suitable for communicating with a video communication or video conferencing server, content servers, social networking servers, video gaming servers, edge computing systems and devices, a table or database server, or other networks or servers. The instructions for carrying out the above mentioned functionality may be stored on a server (which is described in more detail in connection with FIG. 9). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 9). In addition, communications circuitry may include circuitry that enables peer-to-peer communication of computing devices, or communication of computing devices in locations remote from each other (described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 808 may be used to store various types of content described herein as well as image capture system data described above. Nonvolatile memory may also be used (e.g., to launch a boot-up routine and other instructions). Cloud-based storage, described in relation to FIG. 8, may be used to supplement storage 808 or instead of storage 808.

Control circuitry 804 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 804 may also include scaler circuitry for upconverting and downconverting content into the preferred output format of computing device 800. Control circuitry 804 may also include digital-to-analog converter circuitry and analog-to-digital converter circuitry for converting between digital and analog signals. The tuning and encoding circuitry may be used by computing device 800, 801 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is provided as a separate device from computing device 800, the tuning and encoding circuitry (including multiple tuners) may be associated with storage 808.

Control circuitry 804 may receive instruction from a user by way of user input interface 810. User input interface 810 may be any suitable user interface, such as a remote control, mouse, trackball, keypad, keyboard, touch screen, touchpad, stylus input, joystick, voice recognition interface, or other user input interfaces. Display 812 may be provided as a stand-alone device or integrated with other elements of each one of computing device 800 and computing device 801. For example, display 812 may be a touchscreen or touch-sensitive display. In such circumstances, user input interface 810 may be integrated with or combined with display 812. In some embodiments, user input interface 810 includes a remote-control device having one or more microphones, buttons, keypads, any other components configured to receive user input or combinations thereof. For example, user input interface 810 may include a handheld remote-control device having an alphanumeric keypad and option buttons. In a further example, user input interface 810 may include a handheld remote-control device having a microphone and control circuitry configured to receive and identify voice commands and transmit information to set-top box 815.

Audio output equipment 814 may be integrated with or combined with display 812. Display 812 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card or graphical processing unit (GPU) may generate the output to the display 812. Audio output equipment 814 may be provided as integrated with other elements of each one of computing device 800 and computing device 801 or may be stand-alone units. An audio component of videos and other content displayed on display 812 may be played through speakers (or headphones) of audio output equipment 814. In some embodiments, audio may be distributed to a receiver (not shown), which processes and outputs the audio via speakers of audio output equipment 814. In some embodiments, for example, control circuitry 804 is configured to provide audio cues to a user, or other audio feedback to a user, using speakers of audio output equipment 814. There may be a separate microphone 816 or audio output equipment 814 may include a microphone configured to receive audio input such as voice commands or speech. For example, a user may speak letters or words that are received by the microphone and converted to text by control circuitry 804. In a further example, a user may voice commands that are received by a microphone and recognized by control circuitry 804. Camera 819 may be any suitable video camera integrated with the equipment or externally connected. Camera 819 may be a digital camera comprising a charge-coupled device (CCD) and/or a complementary metal-oxide semiconductor (CMOS) image sensor, which may correspond to image sensor 102 of FIG. 1. In some embodiments, camera 819 may be an analog camera that converts to digital images via a video card.

The image capture system may be implemented using any suitable architecture. For example, it may be a stand-alone application wholly implemented on each one of computing device 800 and computing device 801. In such an approach, instructions of the application may be stored locally (e.g., in storage 808), and data for use by the application is downloaded on a periodic basis (e.g., from an out-of-band feed, from an Internet resource, or using another suitable approach). Control circuitry 804 may retrieve instructions of the application from storage 808 and process the instructions to provide video conferencing functionality and generate any of the displays discussed herein. Based on the processed instructions, control circuitry 804 may determine what action to perform when input is received from user input interface 810. For example, movement of a cursor on a display up/down may be indicated by the processed instructions when user input interface 810 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 804 may allow a user to provide user profile information or may automatically compile user profile information. For example, control circuitry 804 may access and monitor network data, video data, audio data, processing data, participation data from a conference participant profile. Control circuitry 804 may obtain all or part of other user profiles that are related to a particular user (e.g., via social media networks), and/or obtain information about the user from other sources that control circuitry 804 may access. As a result, a user can be provided with a unified experience across the user's different devices.

In some embodiments, the image capture system is a client/server-based application. Data for use by a thick or thin client implemented on each one of computing device 800 and computing device 801 may be retrieved on-demand by issuing requests to a server remote to each one of computing device 800 and computing device 801. For example, the remote server may store the instructions for the application in a storage device. The remote server may process the stored instructions using circuitry (e.g., control circuitry 804) and generate the displays discussed above and below. The client device may receive the displays generated by the remote server and may display the content of the displays locally on computing device 800. This way, the processing of the instructions is performed remotely by the server while the resulting displays (e.g., that may include text, a keyboard, or other visuals) are provided locally on computing device 800. Computing device 800 may receive inputs from the user via input interface 810 and transmit those inputs to the remote server for processing and generating the corresponding displays. For example, computing device 800 may transmit a communication to the remote server indicating that an up/down button was selected via input interface 810. The remote server may process instructions in accordance with that input and generate a display of the application corresponding to the input (e.g., a display that moves a cursor up/down). The generated display may then be transmitted to computing device 800 for presentation to the user.

In some embodiments, the image capture system may be downloaded and interpreted or otherwise run by an interpreter or virtual machine (run by control circuitry 804). In some embodiments, the image capture system may be encoded in the ETV Binary Interchange Format (EBIF), received by control circuitry 804 as part of a suitable feed, and interpreted by a user agent running on control circuitry 804. For example, the image capture system may be an EBIF application. In some embodiments, the image capture system may be defined by a series of JAVA-based files that are received and run by a local virtual machine or other suitable middleware executed by control circuitry 804. In some of such embodiments (e.g., those employing MPEG-2, MPEG-4, HEVC or any other suitable digital media encoding schemes), image capture system may be, for example, encoded and transmitted in an MPEG-2 object carousel with the MPEG audio and video packets of a program.

As shown in FIG. 9, devices 906, 907, 908, and 910 may be coupled to communication network 909. In some embodiments, each of computing devices 906, 907, 908, and 910 may correspond to one of computing devices 800 or 801 of FIG. 8, computing device 101 of FIG. 1, or any other suitable device capable, or any combination thereof. Communication network 909 may be one or more networks including the Internet, a mobile phone network, mobile, voice or data network (e.g., a 5G, 4G, or LTE network), cable network, public switched telephone network, or other types of communication network or combinations of communication networks. Paths (e.g., depicted as arrows connecting the respective devices to the communication network 909) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 9 to avoid overcomplicating the drawing.

Although communications paths are not drawn between computing devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The computing devices may also communicate with each other directly through an indirect path via communication network 909.

System 900 may comprise media content source 902, one or more servers 904, and/or one or more edge computing devices. In some embodiments, the image capture system may be executed at one or more of control circuitry 911 of server 904 (and/or control circuitry of computing devices 906, 907, 908, 910 and/or control circuitry of one or more edge computing devices). In some embodiments, media content source 902 and/or server 904 may be configured to host or otherwise facilitate communication sessions between computing devices 906, 907, 908, 910 and/or any other suitable devices, and/or host or otherwise be in communication (e.g., over network 909) with one or more social network services.

In some embodiments, server 904 may include control circuitry 911 and storage 914 (e.g., RAM, ROM, Hard Disk, Removable Disk, etc.). Storage 914 may store one or more databases. Server 904 may also include an input/output path 912. I/O path 912 may provide video conferencing data, device information, or other data, over a local area network (LAN) or wide area network (WAN), and/or other content and data to control circuitry 911, which may include processing circuitry, and storage 914. Control circuitry 911 may be used to send and receive commands, requests, and other suitable data using I/O path 912, which may comprise I/O circuitry. I/O path 912 may connect control circuitry 911 (and specifically control circuitry) to one or more communications paths.

Control circuitry 911 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 911 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 911 executes instructions for an emulation system application stored in memory (e.g., the storage 914). Memory may be an electronic storage device provided as storage 914 that is part of control circuitry 911.

Figure 10:
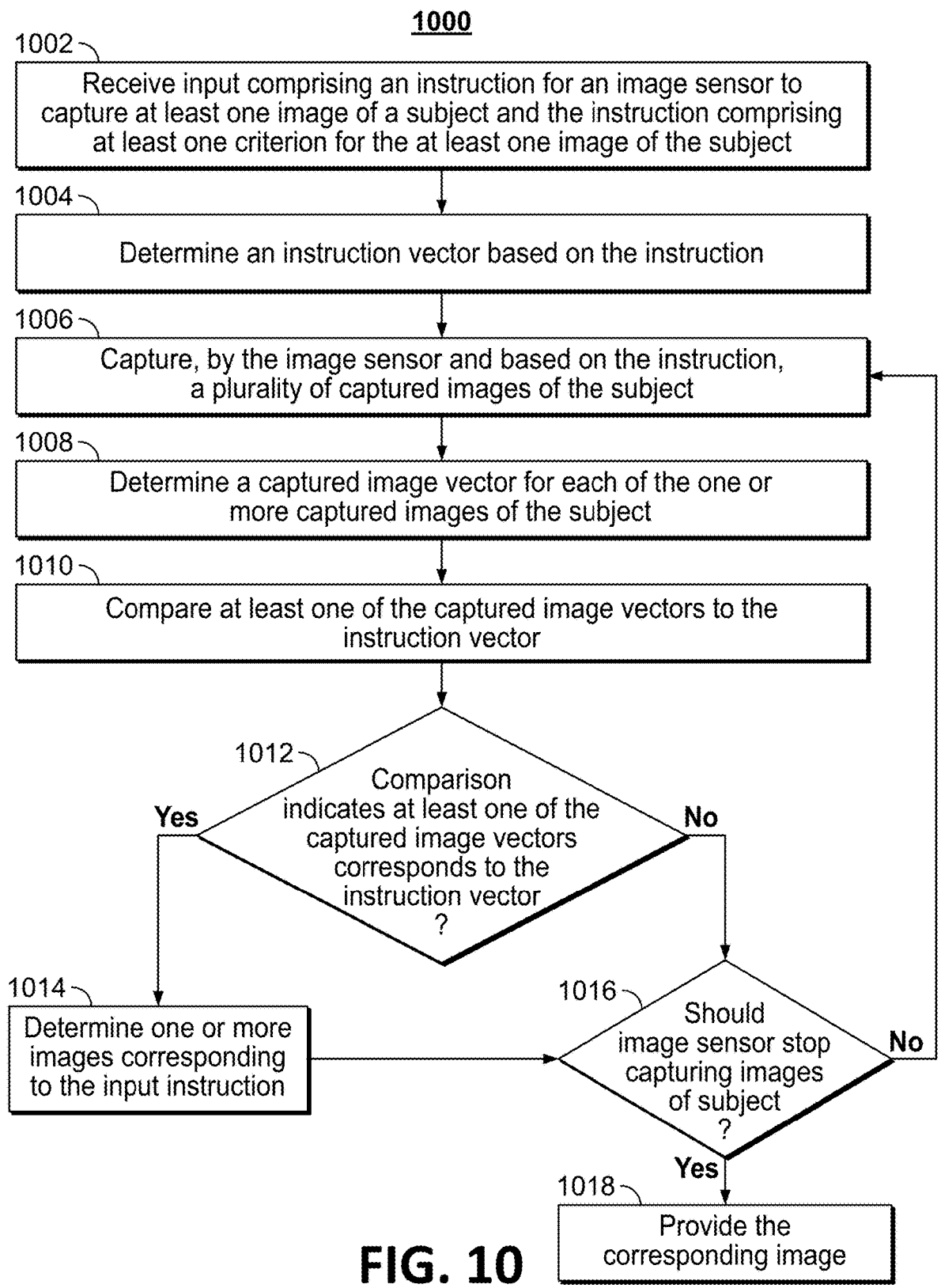
FIG. 10 is a flowchart of a detailed illustrative process for determining an image that corresponds to a received input instruction, in accordance with some embodiments of this disclosure.

FIG. 10 is a flowchart of a detailed illustrative process for determining an image that corresponds to a received input instruction, in accordance with some embodiments of this disclosure. In various embodiments, the individual steps of process 1000 may be implemented by one or more components of the computing devices and systems of FIGS. 1-9 and may be performed in combination with any of the other processes and aspects described herein. Although the present disclosure may describe certain steps of process 1000 (and of other processes described herein) as being implemented by certain components of the computing devices and systems of FIGS. 1-9, this is for purposes of illustration only. It should be understood that other components of the computing devices and systems of FIGS. 1-9 may implement those steps instead.

At 1002, control circuitry (e.g., control circuitry 804 of FIG. 8 and/or control circuitry 911 of FIG. 9) may receive input comprising an instruction for an image sensor to capture at least one image of a subject, and the instruction may comprise at least one criterion for the at least one image of the subject. For example, image sensor 102 and/or computing device 101 of FIG. 1 may receive the input 108 of "Take a picture when everybody jumps" as voice input, a selection of a user interface element, as text entry, haptic input, biometric input, or any other suitable form of input, or any combination thereof. The control circuitry may parse the received input to determine an intent and meaning of the input, such as when input 108 is audio data. In some embodiments, the control circuitry may determine, when parsing input 108, two independent instructions, and perform processing in further steps of FIG. 10 accordingly. For example, the control circuitry may receive the input of "Take a picture when everybody jumps or when everybody runs towards the ocean," and may monitor the captured images for respective images based on each of a first instruction of "Take a picture when everybody jumps" and a second instruction of "Take a picture when everybody runs towards the ocean."

At 1004, the control circuitry may determine an instruction vector based on the instruction of the input received at 1002. For example, the control circuitry may utilize trained machine learning model 200 of FIG. 2 by inputting text corresponding to the "Take a picture when everybody jumps" into model 200, which may be configured to output a vector representation 208 of such text input in a vector space.

At 1006, the control circuitry may cause one or more images of the subject to be captured by the image sensor. For example, image sensor 102 of FIG. 1 may begin capturing one or more images of the five people on the beach, as shown at 112 of FIG. 1. In some embodiments, the capturing of images at 1006 may correspond to the observing mode (e.g., in which images are observed and analyzed) and/or the burst mode (e.g., when curve 502 exceeds threshold 508 in FIGS. 5A-5B) as discussed in connection with FIG. 3. In some embodiments, such one or more images captured at 1006 may be transferred to transient memory, e.g., a buffer memory associated with image sensor 102 and/or computing device 101, for further analysis. In some embodiments, for capture of the images at 1006, a parameter (e.g., FPS and/or resolution) may be adjusted, e.g., an FPS may be increased to facilitate the acquisition of more samples for analysis and the resolution may be decreased to enable such analysis to be performed faster or using less computational resources, such as during the observing mode. In some embodiments, at 1006, a burst mode may be performed (e.g., upon determining a curve 502 exceeds threshold 508, in association with a captured image) in which full-resolution images may be captured at an enhanced FPS. In some embodiments, such observing mode and burst mode may be performed in parallel.

At 1008, the control circuitry may determine a captured image vector for each of the one or more captured images of the subject captured at 1006. For example, for each captured image, the control circuitry may utilize trained machine learning model 200 of FIG. 2 by inputting the captured image into model 200. Model 200 may be configured to output a respective vector representation 210 of each of the one or more input captured images in a same vector space as vector 208 representing the text of the instruction received at 1002. In some embodiments, as each image is captured at 1006, the images may be transferred (frame by frame) to a buffer memory of computing device 101 and/or image sensor 102, for vectorization to the captured image vector.

At 1010, the control circuitry may compare the instruction vector determined at 1004 with at least one captured image vector of the plurality of captured image vectors (which may be stored in a buffer associated with image sensor 102 and/or computing device 101). For example, as shown in FIG. 4, once machine learning model 200 of FIG. 2 is trained, a text description input to model 200 may be encoded as a vector T (or any other suitable numerical representation), and an image input to model 200 may be encoded as a vector I (or any other suitable numerical representation), and each of vectors T (e.g., an instruction vector) and I (e.g., a captured image vector) may correspond to a same vector space 400. The image capture system may determine whether vectors T and I are sufficiently similar using any suitable technique. For example, for each captured image vector to be compared, the image capture system may perform an inner product operation I·T (or a cosine similarity operation as between I and T) to determine whether the inner product exceeds (or is below) a threshold (e.g., threshold 508 shown in FIGS. 5A-5B); if so, one or more corresponding images may be identified at 1014. In some embodiments, a smaller angle between the vectors may be indicative of a better corresponding, e.g., the image capture system may compare the angle between the vectors to a threshold value, and identify that a corresponding image is present if the angle is less than the threshold value.

If none of the one or more captured images sufficiently correspond to the input instruction (e.g., the comparison results in a value less than the threshold 508 shown in FIGS. 5A-5B), or if less than a threshold number of images sufficiently correspond to the input instruction, processing may proceed to 1016. In some embodiments, a number of captured images to be compared to the instruction vector may depend on whether one or more close correspondences are identified, e.g., captured image vectors may continue to be computed and/or compared until a sufficient correspondence is determined. In some embodiments, images may continue to be captured while the computations of captured image vectors and their comparisons with the instruction vector are being performed.

At 1016, the control circuitry may determine whether to cause the image sensor to stop capturing images of the subject. For example, the control circuitry may determine to cause the image sensor to stop capturing images (and thus cause processing to proceed to 1018) of the subject if comparison at 1010 indicates that one or more of the captured images (or that a certain number of images) is below a threshold (e.g. threshold 508 shown in FIGS. 5A-5B), or based on receiving user input, or based on determining that a sufficient number of corresponding images have been captured, or based on any other suitable criterion. In some embodiments, captured image(s) determined to be below the threshold based on the comparison at 1010 may be discarded or overwritten in the buffer or other storage of computing device 101 and/or image sensor 102 of FIG. 1.

In some embodiments, the control circuitry may cause processing to return to 1006, upon determining, for example, that a sufficient number of corresponding images have not been captured, or that a correspondence score is above a second threshold (e.g., below a first threshold 508 shown in FIGS. 5A-5B but still relatively high) or is otherwise relatively close to the first threshold, or based on a number of images being captured not being sufficient, or based on received input, or based on any other suitable criteria, or any combination thereof. In some embodiments, an amount by which the FPS, resolution, other parameter, or any combination thereof, is adjusted (e.g., at 1006) may depend on the value of the one or more angles resulting from the comparisons of step 1012. For example, the smaller the angle(s) resulting from the comparison of step 1010, indicating a strong correspondence between the captured image(s) and the instruction of the input, the higher that the frequency of FPS of image capture may be adjusted.

At 1018, the control circuitry may provide the one or more corresponding images, e.g., to user 111 of FIG. 1. For example, the user may be presented with an interface via computing device 101, such as shown at FIG. 7, to enable the user to decide which of the corresponding images to persistently store or otherwise post to an application or website or otherwise transmit to another computing device. In some embodiments, each of the one or more corresponding images may be automatically stored, or a threshold number of the highest-scored one or more corresponding images may be automatically stored.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method comprising:
receiving input comprising an instruction for an image sensor to capture at least one image of a subject, and the instruction comprising at least one criterion for the at least one image of the subject;
capturing, by the image sensor and based on the instruction, a plurality of captured images of the subject;
determining an instruction vector based on the instruction;
determining a captured image vector for each of the plurality of captured images of the subject;
comparing at least one captured image vector of the plurality of captured images and the instruction vector to determine a corresponding image from the plurality of captured images by:
determining a plurality of angles, each angle of the plurality of angles comprising an angle created by a respective captured image vector and the instruction vector; and
determining the corresponding image from the plurality of captured images based on a corresponding angle of the plurality of angles that is smallest or that is less than a threshold value; and
providing the corresponding image.

2. The method of claim 1, wherein:
the capturing, by the image sensor, of the plurality of captured images of the subject is performed at a particular frames per second (FPS); and
the method further comprises increasing the particular FPS in real time based on the plurality of angles.

3. The method of claim 1, wherein:
the capturing, by the image sensor, of the plurality of captured images of the subject is performed at a particular resolution; and
the method further comprises adjusting the particular resolution in real time based on the plurality of angles.

4. The method of claim 1, wherein determining the instruction vector comprises:
determining text that corresponds to the at least one criterion; and
providing the text to a trained machine learning model which outputs the instruction vector based at least in part on the text.

5. The method of claim 1, wherein determining the captured image vector for each of the plurality of captured images of the subject comprises:
for each respective captured image of the plurality of captured images, providing the respective captured image to a trained machine learning model which outputs a respective captured image vector for the provided respective captured image.

6. The method of claim 1, further comprising:
training a machine learning model to receive as input text corresponding to at least one criterion for at least one image of a subject, and to provide as output an instruction vector;
training the machine learning model to receive as input a captured image, and to provide as output a captured image vector.

7. The method of claim 1, wherein the received input is voice input, textual input, tactile input, or any combination thereof.

8. The method of claim 1, wherein the at least one criterion is a first criterion, the instruction further comprising a second criterion, the instruction vector is a first instruction vector that corresponds to the first criterion, the corresponding image is a first corresponding image, and the method further comprises:
determining a second instruction vector based on the second criterion of the instruction;
comparing at least one captured image vector of the plurality of captured images and the second instruction vector to determine a second corresponding image from the plurality of captured images; and
providing the second corresponding image.

9. A system comprising:
an image sensor;
control circuitry configured to:
receive input comprising an instruction for the image sensor to capture at least one image of a subject and the instruction comprising at least one criterion for the at least one image of the subject;
capture, by the image sensor and based on the instruction, a plurality of captured images of the subject;
determine an instruction vector based on the instruction;
determine a captured image vector for each of the plurality of captured images of the subject;
compare at least one captured image vector of the plurality of captured images and the instruction vector to determine a corresponding image from the plurality of captured images by:
determining a plurality of angles, each angle of the plurality of angles comprising an angle created by a respective captured image vector and the instruction vector; and
determining the corresponding image from the plurality of captured images based on a corresponding angle of the plurality of angles that is smallest or that is less than a threshold value; and
provide the corresponding image.

10. The system of claim 9, wherein the control circuitry is configured to:
cause the image sensor to capture the plurality of captured images of the subject at a particular frames per second (FPS); and
increase the particular FPS in real time based on the plurality of angles.

11. The system of claim 9, wherein the control circuitry is configured to:
cause the image sensor to capture the plurality of captured images of the subject at a particular resolution; and
adjust the particular resolution in real time based on the plurality of angles.

12. The system of claim 9, wherein the control circuitry is configured to determine the instruction vector by:
determining text that corresponds to the at least one criterion; and
providing the text to a trained machine learning model which outputs the instruction vector based at least in part on the text.

13. The system of claim 9, wherein the control circuitry is configured to determine the captured image vector for each of the plurality of captured images of the subject by:
for each respective captured image of the plurality of captured images, providing the respective captured image to a trained machine learning model which outputs a respective captured image vector for the provided respective captured image.

14. The system of claim 9, wherein the control circuitry is further configured to:
train a machine learning model to receive as input text corresponding to at least one criterion for at least one image of a subject, and to provide as output an instruction vector;
train the machine learning model to receive as input a captured image, and to provide as output a captured image vector.

15. The system of claim 9, wherein the received input is voice input, textual input, tactile input, or any combination thereof.

16. The system of claim 9, wherein the at least one criterion is a first criterion, the instruction further comprising a second criterion, the instruction vector is a first instruction vector that corresponds to the first criterion, the corresponding image is a first corresponding image, and the control circuitry is further configured to:
determine a second instruction vector based on the second criterion of the instruction;
compare at least one captured image vector of the plurality of captured images and the second instruction vector to determine a second corresponding image from the plurality of captured images; and
provide the second corresponding image.

17. The system of claim 9, wherein the received input indicates a type of the at least one image of the subject to be captured by the image sensor.

18. A computer-implemented method, comprising:
receiving input comprising an instruction for an image sensor to capture at least one image of a subject, and the instruction comprising a first criterion and a second criterion for the at least one image of the subject;
generating a first vector based on the first criterion of the instruction;
generating a second vector based on the second criterion of the instruction;
causing the image sensor to observe a scene;
analyzing the observed scene and generating, based on the analyzed scene, a plurality of third vectors;
based on a correspondence between the first vector and at least one of the plurality of third vectors, causing the image sensor to capture one or more first images of the scene;
based on a correspondence between the second vector and at least one of the plurality of third vectors, causing the image sensor to capture one or more second images of the scene;
analyzing the one or more captured first images to determine an image corresponding to the first vector;
analyzing the one or more captured second images to determine an image corresponding to the second vector;
providing the determined image corresponding to the first vector; and
providing the determined image corresponding to the second vector.

19. The method of claim 18, wherein the received input is voice input, textual input, tactile input, or any combination thereof.

20. The method of claim 18, wherein the instruction requests the at least one image of the subject to be captured when at least one of the first criterion or the second criterion is met, wherein the determined image corresponding to the first vector meets the first criterion but not the second criterion, and the determined image corresponding to the second vector meets the second criterion but not the first criterion.

* * * * *